United States Patent
Kasahara et al.

(10) Patent No.: US 7,080,255 B1
(45) Date of Patent: Jul. 18, 2006

(54) SECRET KEY GENERATION METHOD, ENCRYPTION METHOD, AND CRYPTOGRAPHIC COMMUNICATIONS METHOD AND SYSTEM

(75) Inventors: Masao Kasahara, Minoo (JP); Yasuyuki Murakami, Kyoto (JP); Shigeo Tsujii, Shibuya-ku (JP)

(73) Assignee: Murata Kikai Kabushiki Kaisha, Osaka (JP)

( * ) Notice: Subject to any disclaimer, the term of this patent is extended or adjusted under 35 U.S.C. 154(b) by 0 days.

(21) Appl. No.: 09/573,915

(22) Filed: May 18, 2000

(30) Foreign Application Priority Data

| May 19, 1999 | (JP) | .................................. 11-139285 |
| Jul. 14, 1999 | (JP) | .................................. 11-200919 |

(51) Int. Cl.
*H04L 9/32* (2006.01)

(52) U.S. Cl. ........................ 713/182; 380/255; 380/262; 380/279; 380/280; 709/223; 709/229

(58) Field of Classification Search ................ 380/255, 380/259, 268, 277–278, 279, 282, 44, 46–47, 380/28, 48, 262, 280; 713/182, 200–201; 709/223–229
See application file for complete search history.

(56) References Cited

U.S. PATENT DOCUMENTS

| 5,016,276 A | | 5/1991 | Matumoto et al. |
| 5,046,094 A | * | 9/1991 | Kawamura et al. ............ 380/46 |
| 5,987,129 A | * | 11/1999 | Baba ............................ 380/278 |
| 6,237,097 B1 | * | 5/2001 | Frankel et al. .............. 713/180 |
| 6,269,164 B1 | * | 7/2001 | Pires ............................ 380/42 |
| 6,553,351 B1 | * | 4/2003 | De Jong et al. ............ 705/69 |
| 6,701,435 B1 | * | 3/2004 | Numao et al. .............. 713/168 |
| 6,788,788 B1 | * | 9/2004 | Kasahara et al. ............ 380/277 |
| 6,798,884 B1 | * | 9/2004 | Kasahara et al. ............ 380/28 |
| 6,813,357 B1 | * | 11/2004 | Matsuzaki et al. .......... 380/279 |
| 6,834,333 B1 | * | 12/2004 | Yoshino et al. ............. 711/163 |

FOREIGN PATENT DOCUMENTS

JP 59-161152 9/1984

OTHER PUBLICATIONS

Stinson, Cryptography Theory and Practice, 1995, CRC Press, p. 359-376.*

S. Tsujii et al., "A New Concept of Key Sharing Systems", The 1999 Symposium on Cryptography and Information Security, Jan. 1999.

M. Kasahara et al., "Common-key Sharing Scheme Based on Double Exponential Function", Technical Report of IEICE, May 1999.

M. Kasahara et al., "Common-key Sharing Scheme Based on Double Exponential Function", Technical Report of IEICE, Jul. 1999.

(Continued)

*Primary Examiner*—Thomas R. Peeso
(74) *Attorney, Agent, or Firm*—Hogan & Hartson LLP

(57) ABSTRACT

A cryptographic communications method is provided which is based on ID-NIKS and is resilient to collusive attack. Centers (1) established in a plurality generate secret keys peculiar to entities (a, b) using division vectors wherein specifying information (ID information) for said entities is divided and personal secret random numbers set differently for each component in the division vectors. The centers (1) then distribute the secret keys to the entities. The entities generate common keys using components, contained in their own peculiar secret keys, that correspond to the division vectors of other entities. Each division vector is configured with codewords of an error correcting code.

8 Claims, 6 Drawing Sheets

OTHER PUBLICATIONS

Rolf Blom, "Non-Public Key Distribution", Advanced in cryptology: proceedings of CRYPTO 82 / edited by David Chaum, Ronald L. Rivest, and Alan T. Sherman / New York: Plenum Press, pp. 231-236.

Adi Shamir, "Identity-Based Cryptosystems and Signature Schemes", Advances in Cryptology: proceedings of CRYPTO 84 / edited by G.R. Blakley and David Caum / Berlin; Tokyo: Springer-Verlag, pp. 47-53.

* cited by examiner

SECRET KEY GENERATION METHOD, ENCRYPTION METHOD, AND CRYPTOGRAPHIC COMMUNICATIONS METHOD AND SYSTEM

BACKGROUND OF THE INVENTION

1. Field of the Invention

This invention relates to a secret key generation method for generating entity-specific secret keys, an encryption method for encrypting information so that it cannot be comprehended by anyone other than an authorized person, a cryptographic communications method for conducting communications via ciphertext, a cryptographic communications system, a recording medium (computer-readable medium), and a propagated signal (computer data signal embodied in a carrier wave).

2. Description of the Related Art

In today's world, characterized by sophisticated information utilization, important business documents and image information are transmitted and processed in the form of electronic information over an infrastructure of computer networks. By its very nature, electronic information can be easily copied, making it extremely difficult to distinguish between the copy and the original, and information security has become a very serious problem. The realization of computer networks which support "shared computer resources," "multi-access," and "broad-area implementation" is particularly indispensable to the establishment of a high-level information society. However, that very realization involves aspects which are inconsistent with the security of information exchanged between authorized parties. An effective technique for eliminating that inconsistency is encryption technology, which up until now, in the course of human history, has been primarily used in the fields of military operations and foreign diplomacy.

Cryptography is the process of converting information so that its meaning cannot be understood by anyone other than the authorized parties. In cryptographic operations, the conversion of the original text (plaintext) that anyone can understand to text (ciphertext) the meaning of which cannot be understood by a third party is called encryption, and the restoration of that encrypted text to plaintext is called decryption. The overall system wherein this encryption and decryption are performed is called a cryptosystem. In the processes of encryption and decryption, respectively, secret information called encryption keys and decryption keys are employed. A secret decryption key is necessary at the time of decryption, so that only a party knowledgeable of that decryption key can decrypt the cipher text. Accordingly, the confidentiality of the information is maintained by the encryption.

The encryption key and decryption key may be the same or they may be different. A cryptosystem wherein both keys are the same is called a common key cryptosystem, and the DES (Data Encryption Standards) adopted by the Bureau of Standards of the U.S. Department of Commerce is a typical example thereof. Conventional examples of such common key encryption schemes can be divided into the following three types.

(1) Type 1

All common keys possibly shared by other parties (entities) who may communicate with yourself by way of cryptographic communications are held in secret.

(2) Type 2

Keys are shared by a remote party and yourself via a preparatory communication each time before cryptographic communications are conducted (including Diffie-Hellman-based key sharing scheme, key delivery schemes based on public key schemes, etc.)

(3) Type 3

Disclosed specifying information (ID (identity) information) that specifies each of individuals concerned, such as a sender's (entity) name and address, a receiver's (entity) name and address, etc., is used, and both the sending entity and receiving entity independently generate the same common key without preparatory communications (including KPS (key predistribution system), ID-NIKS (ID-based non-interactive key sharing scheme), etc.).

Such conventional methods as seen in these three types of schemes are subject to the problems described below. With the method of type 1, all of the common keys are stored, wherefore this scheme is unsuitable for a network community wherein users in unspecified large numbers become entities and conduct cryptographic communications. With the method of type 2, the preparatory communications are required for key sharing.

The method of type 3 is a convenient method because it requires no preparatory communications, and a common key with an arbitrary party can be generated using the disclosed specifying information (ID information) of that party together with characteristic secret parameters distributed beforehand from a center. Nevertheless, this scheme is subject to the following two problems. Firstly, the center must become a "big brother" (creating a key escrow system wherein the center holds the secrets of all of the entities). Secondly, there is a possibility that some number of entities could collude to compute the center secrets. In the face of this collusion problem, many innovative techniques have been devised to circumvent the problem by way of computation volume, but a complete solution is very difficult.

The difficulties of resolving this collusion problem arise from the fact that the secret parameters based on the specifying information (ID information) form dual structures comprising center secrets and personal secrets. With the method 3, a cryptosystem is configured using the disclosed parameters of the center, the disclosed specifying information (ID information) of the individual entities, and these two types of secret parameters. Not only so, but it is necessary also to make it so that center secrets will not be revealed even if the entities compare the personal secrets distributed to each. Accordingly, there are many problems that must be resolved before this cryptosystem can be actually realized.

Thereupon, the inventors proposed in Japanese Patent Application No. H11-16257/1999 filed on Jan. 25, 1999, Japanese Patent Application No. H11-59049/1999 filed on Mar. 5, 1999 and corresponding U.S. patent application Ser. No. 09/489,696 fled on Jan. 24, 2000 claiming priority of these two Japanese Patent Applications and entitled "SECRET KEY GENERATION METHOD, ENCRYPTION METHOD, CRYPTOGRAPHIC COMMUNICATIONS METHOD, COMMON KEY GENERATOR, CRYPTOGRAPHIC COMMUNICATIONS SYSTEM, AND RECORDING MEDIA", hereinafter collectively referred to as "preceding inventions", secret key generation methods, together with encryption methods and cryptographic communications methods, based on ID-NIKS wherein the specifying information (ID information) of each of a plurality of entities is divided into a plurality of portions, these portions of divided ID information are sent to a plurality of centers respectively, the centers prepare secret keys based on the entity's divided ID information, and the secret keys are sent back to the entity from the centers. This secret key preparation and distribution is conducted for other entities. By doing so, the mathematical structures can be held down to a minimum, the collusion problem can be avoided, and the cryptosystem can easily built up. The entire disclosures of the above-mentioned two Japanese Patent Applications and single U.S. patent application are incorporated herein by reference.

The reason why the various cryptosystems based on entity specifying information (ID information) proposed for the purpose of resolving the collusion problem have been unsuccessful lies in excessively seeking mathematical structures to provide innovative techniques for preventing center secrets from being deduced from entity collusion information. When the mathematical structures are too complex, the method of demonstrating safety becomes very difficult. That being so, in the methods proposed in the preceding inventions, the mathematical structures are held to a bare minimum by dividing entity specifying information into a plurality of units and distributing all the secret keys created from the divided specifying information (each unit of ID information) to the entities.

In the preceding inventions, trustable centers are deployed in a plurality, and each center generates a secret key, having no mathematical structure and corresponding to one unit of divided specifying information for each of the entities, and sends that to the entity concerned. Each entity generates a common key, without performing preparatory communications, from the disclosed specifying information (ID information) of another entity to communicate with and the secret keys sent from the centers. Accordingly, no one center will be in possession of the secrets of all entities, and the centers will not become "big brothers."

The inventors continued with research to improve this method utilizing the division of entity's ID information. This research was particularly focused on realizing an improved method that would be resistive to collusive attacks wherein a plurality of entities collude and attack a certain entity using all of their secret keys.

SUMMARY OF THE INVENTION

The present invention was devised in view of the situation described in the foregoing. An object of the present invention is therefore to provide a secret key generation method and encryption method that improve the methods described in the foregoing and that are resilient to collusive attack.

In the methods proposed in the preceding inventions, a personal secret random number for each entity is included in each division vector that corresponds to each divided ID information, and each division vector includes a plurality of components that correspond to the entities respectively. These personal secret random numbers, however, are constant as long as the same entity is concerned, and accordingly the values of the personal secret random numbers in the components of the division vectors are the same for the same entity. As a result, there is a possibility of being subjected to a collusive attack. That being so, in the present invention, all or some of the personal secret random numbers in the division vectors are not made constant for the same entity, and the personal secret random numbers are established differently for the components in the division vectors, whereupon the resilience to collusive attack can be made more secure.

In the present invention, furthermore, the division vectors are configured with codewords of error correcting code. Accordingly, the resistance to collusive attack is made even stronger by combining this division of specifying information (ID information) based on these codewords into the personal secret random number diversifying scheme described above.

According to still another aspect of the present invention, specifying information of an entity is divided into a plurality of blocks, a single row vector is extracted from a symmetrical matrix peculiar to each of the information blocks such that the single row vector corresponds to one block of entity specifying information, the single row vector is then divided into a plurality of partial vectors such that a sum of these partial vectors becomes the original single row vector, different random number vectors peculiar to the entity are assigned to each of the partial vectors, and secret keys peculiar to the entity are generated. Hence, in an encryption scheme that uses divided specifying information, safety can be enhanced against random number substitution attack.

Additional objects, benefits and advantages of the present invention will become apparent to those skilled in the art to which the present invention relates from the subsequent description of the embodiments and the appended claims, taken in conjunction with the accompanying drawings.

DETAILED DESCRIPTION OF THE INVENTION

First Embodiment

Figure 1:
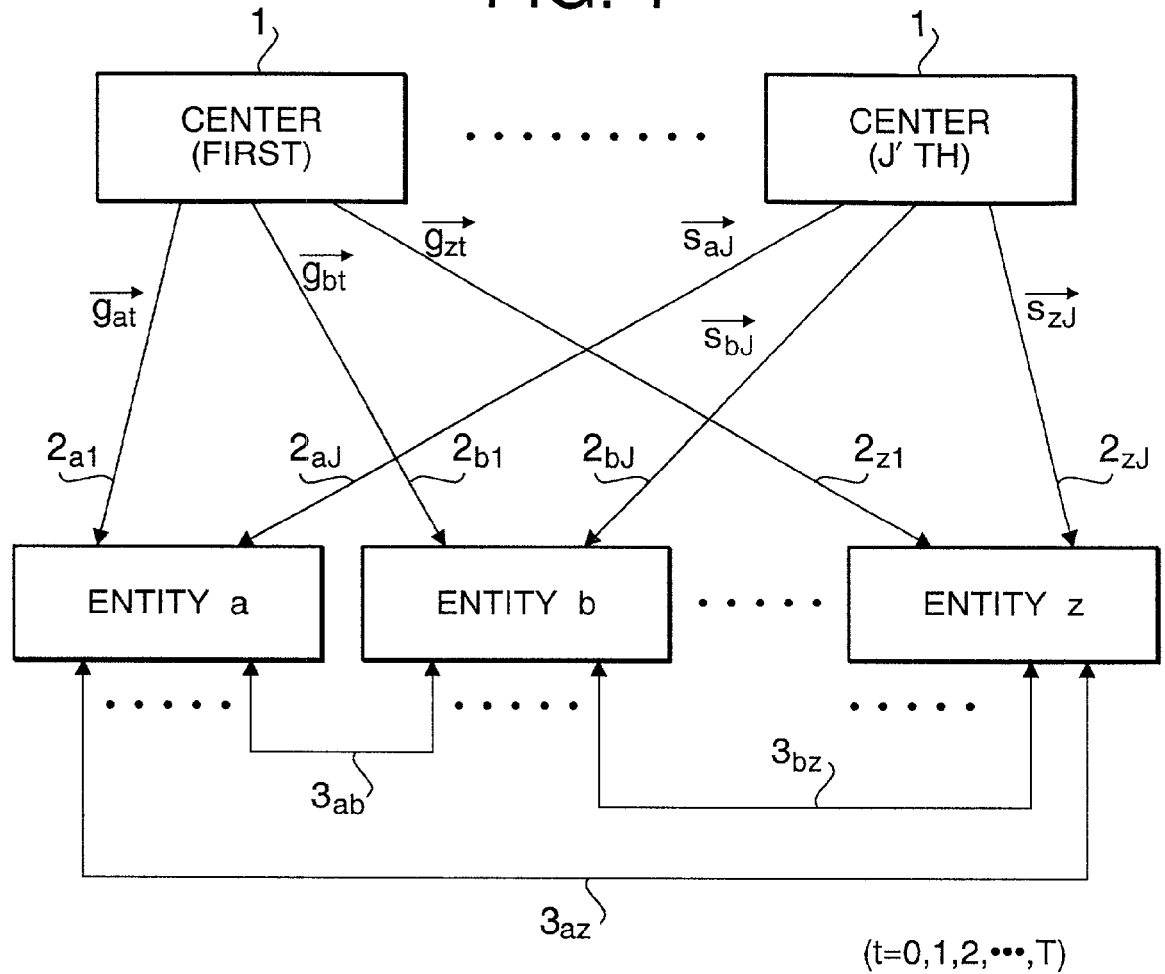
FIG. 1 is a schematic diagram illustrating the configuration of a cryptographic communications system according to an embodiment of the present invention.

Referring to FIG. 1, illustrated is a model diagram representing the configuration of a cryptographic communications system in the present invention and in the preceding inventions using an ID-NIKS scheme employing divided specifying information wherein specifying information (ID information) for each entity is divided into a plurality of blocks. A plural number (J) of centers 1 that can be trusted to maintain information confidentiality is established, which centers 1 might be public institutions in society, for example.

These centers 1 are connected to a plurality of entities a, b, . . . , z that are the users employing this cryptosystem by secret communication paths (channels) $2_{a1}$, . . . , $2_{aJ}$, $2_{b1}$, . . . , $2_{bJ}$, . . . , $2_{z1}$, . . . , $2_{zJ}$. Secret key information is sent from the centers 1 via these secret communication paths to the entities a, b, . . . , z. Communication paths $3ab$, $3az$, $3bz$, etc., are also provided between pairs of entities. Ciphertext obtained by encrypting communications information is sent back and forth between entities via these communication paths $3ab$, $3az$, $3bz$, etc.

First, a cryptographic communications scheme indicated in one preceding invention (Japanese Patent Application No. H11-59049/1999) that is an example subject to improvement by the present invention is described.

Preparatory Processing at Centers 1:

The centers 1 prepare public keys and secret keys as follows and disclose the public keys.

| | | |
|---|---|---|
| Public key | N | N = PQ |
| | J | Number of ID vector division blocks |
| | $M_j$ | Size of divided ID vector (where $j = 1, 2, \ldots, J$) |
| | L | Size of ID vector ($L = M_1 + M_2 + \ldots + M_j$) |
| | T | Degree of exponent portion |
| Secret key | P, Q | Large prime numbers |
| | g | Maximum generation origin with modulo N |
| | $H_j$ | Symmetrical $2^{Mj} \times 2^{Mj}$ matrix formed of random numbers |
| | $\alpha_e$ | Personal secret random number of entity e (where gcd $(\alpha_e, \lambda(N)) = 1$ and $\lambda(\cdot)$ is Carmichael function) |
| | $\beta_{ej}$ | Personal secret random number of entity e (where $\beta_{e1} + \beta_{e2} + \ldots + B_{ej} = \lambda(N)$) |

Figure 2:
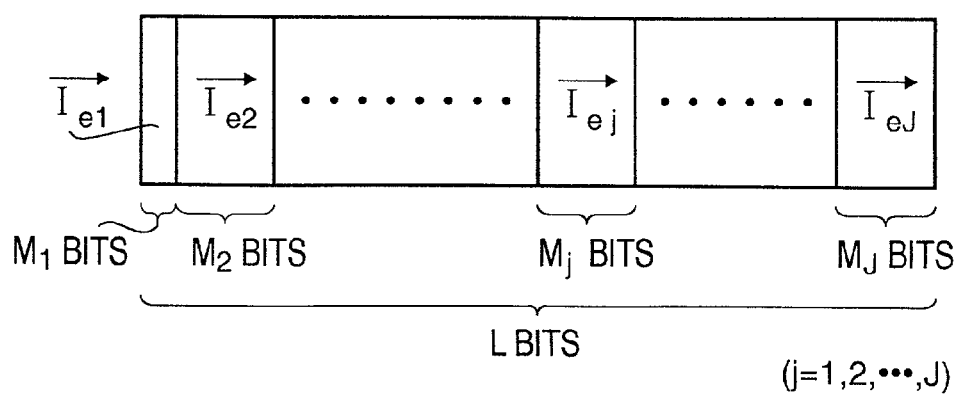
FIG. 2 diagrammatically illustrates division of entity's ID vector used in the communications system shown in FIG. 1.

ID vector of each entity that is specifying information indicating, for example, a name and address of that entity is prepared in the form of L-dimension binary vector, and this ID vector is divided into J blocks having block size of $M_1$, $M_2, \ldots, M_J$, as diagrammed in FIG. 2. The ID vector for entity e i.e. vector $I_e$), for example, is divided as indicated in formula 1 below. The vectors $I_{ej}$ ($j=1, 2, \ldots, J$), that are divided specifying information, are called ID division vectors.

$$\vec{I_e} = [\vec{I_{e1}} | \vec{I_{e2}} | \ldots | \vec{I_{eJ}}] \qquad (1)$$

Entity Registration Processing:

When the centers 1 are requested by an entity e for registration, J secret key vectors $s_{ej}$ ($j=1, 2, \ldots, J$) corresponding, respectively, to a prepared secret key (keys) and J ID division vectors for entity e are calculated according to formulas 2-1, 2-2, . . . , 2-j, . . . , 2-J below.

$$\vec{s_{e1}} = \alpha_e H_1 [\vec{I_{e1}}] + \beta_{e1} \vec{1} \qquad (2\text{-}1)$$

$$\vec{s_{e2}} = \alpha_e H_2 [\vec{I_{e2}}] + \beta_{e2} \vec{1} \qquad (2\text{-}2)$$

$$\vec{s_{ej}} = \alpha_e H_1 [\vec{I_{ej}}] + \beta_{ej} \vec{1} \qquad (2\text{-}j)$$

$$\vec{s_{ej}} = \alpha_e H_j [\vec{I_{ej}}] + \beta_{ej} \vec{1} \qquad (2\text{-}J)$$

Here, vector 1 represents a vector of J dimension with all of its components being 1. The representation $H_j$ [vector $I_{ej}$] indicates one row corresponding to the vector $I_{ej}$, which is extracted from the symmetrical matrix $H_j = (k_{em}^{(j)})$. The [·] operation is defined for reference.

Next, for the 1st block, T+1 secret key vectors $g_{et}$ ($t=0, 1, 2, \ldots, T$) are calculated according to formulas 3-0, 3-1, 3-2, . . . , 3-t, . . . , 3-T below.

$$\vec{g_{e0}} \equiv g^{\alpha_e^{-T}} \vec{1} \,(\text{mod} N) \qquad (3\text{-}0)$$

$$\vec{g_{e1}} \equiv g^{\alpha_e^{-T} \vec{s_{e1}}} \,(\text{mod} N) \qquad (3\text{-}1)$$

$$\vec{g_{e2}} \equiv g^{\alpha_e^{-T} (\vec{s_{e1}})^2} \,(\text{mod} N) \qquad (3\text{-}2)$$

$$\vec{g_{et}} \equiv g^{\alpha_e^{-T} (\vec{s_{e1}})^t} \,(\text{mod} N) \qquad (3\text{-}t)$$

$$\vec{g_{eT}} \equiv g^{\alpha_e^{-T} (\vec{s_{e1}})^T} \,(\text{mod} N) \qquad (3\text{-}T)$$

Here, when c is a scalar, and A and B indicated in formulas 4 and 5 below are matrixes, then the expressions $B = c^A$ and $B = \langle A \rangle^c$ are given in formulas 6 and 7, respectively.

$$A = (a_{\mu\nu}) \qquad (4)$$

$$B = (b_{\mu\nu}) \qquad (5)$$

$$b_{\mu\nu} = c^{a_{\mu\nu}} \qquad (6)$$

$$b_{\mu\nu} = a_{\mu\nu}^c \qquad (7)$$

One of the centers 1 sends the T+1 secret key vectors $g_{et}$ ($t=0, 1, 2, \ldots, T$) relating to the 1st block to entity e in secret, while the remaining J−1 centers 1 send J−1 secret key vectors $s_{ej}$ ($j=2, 3, \ldots, J$) relating to the blocks from the 2nd block on to entity e in secret.

Processing for Generating Common Key between Entities:

Entity e, for the 1st block, selects from its own T+1 secret key vectors $g_{et}$ a vector $g_{et}$ [vector $I_{m1}$] of the component corresponding to vector $I_{m1}$ that is the ID division vector of entity m being communicated with. The vectors selected are represented below in formulas 8-0, 8-1, . . . , 8-t, . . . , 8-T.

$$g_{0em} = \vec{g_{e0}}[\vec{I_{m1}}] \qquad (8\text{-}0)$$

$$g_{1em} = \vec{g_{e1}}[\vec{I_{m1}}] \qquad (8\text{-}1)$$

$$g_{tem} = \vec{g_{et}}[\vec{I_{m1}}] \qquad (8\text{-}t)$$

$$g_{Tem} = \vec{g_{eT}}[\vec{I_{m1}}] \qquad (8\text{-}T)$$

Next, entity e, for the second, third, . . . , and J'th blocks ($j=2, 3, \ldots, J$), selects, from its own secret key vectors $s_{ej}$, vectors $s_{ej}$ [vectors $I_{mj}$] of the components corresponding to vectors $I_{mj}$ that are the ID division vectors of entity m. The vectors selected are represented below in formulas 9-2, . . . , 9-j, . . . , 9-J.

$$x_{2em} = \vec{s_{e2}}[\vec{I_{m2}}] \qquad (9\text{-}2)$$

$$x_{1em} = \vec{s_{e1}}[\vec{I_{m1}}] \qquad (9\text{-}1)$$

$$x_{jem} = \vec{s_{ej}}[\vec{I_{mj}}] \tag{9-J}$$

Then, the sum $y_{em}$ for all of these is found on the integer ring as in formula 10 below.

$$y_{em} = \sum_{j=2}^{J} x_{jem} \tag{10}$$

Then, by performing calculation as in formula 11 below with modulo N, the common key $K_{em}$ derived. In the calculation in this formula 11, by completing the calculations for all of the blocks, the personal secret random number $\alpha_e$ is eliminated by multiplication by the inverse element thereof, and the personal secret random numbers $\beta_{ej}$, which are J in number, are eliminated by additions thereof. This $K_{em}$ coincides with the common key $K_{me}$ derived by entity m at its end.

$$K_{em} \equiv \prod_{t=0}^{T} g_{tem}^{TC_t y_{em}^{(T-t)}} \tag{11}$$

$$\equiv g\alpha_e^{-T} \sum_{t=0}^{T} TCx_{1em}^t y_{em}^{T-t}$$

$$\equiv g\alpha_e^{-T}(x_{1em} + y_{em})^T$$

$$\equiv g\alpha_e^{-T}(x_{1em} + \ldots + x_{jem})^T$$

$$\equiv g\alpha_e^{-T}\{\alpha_e H_1[\vec{I_{e1}}][\vec{I_{m1}}] + \beta_{e1} + \ldots + \alpha_e H_j[\vec{I_{ej}}][\vec{I_{mj}}] + \beta_{ej}\}^T$$

$$\equiv g\alpha_e^{-T}\{\alpha_e(H_1[\vec{I_{e1}}][\vec{I_{m1}}] + \ldots + H_j[\vec{I_{ej}}][\vec{I_{mj}}]) + \lambda(N)\}^T$$

$$\equiv g\alpha_e^{-T}\{\alpha_e(H_1[\vec{I_{e1}}][\vec{I_{m1}}] + \ldots + H_j[\vec{I_{ej}}][\vec{I_{mj}}])\}^T$$

$$\equiv g(H_e[\vec{I_{e1}}][\vec{I_{m1}}] + \ldots + H_j[\vec{I_{ej}}][\vec{I_{mj}}])^T \pmod{N}$$

In the formula above we let $x_{1em}$=vector $s_{e1}$ [vector $I_{m1}$], but this vector $s_{e1}$ is not even known to entity e. Also, because T is a comparatively small number, the exponent portion can be calculated by successively and repeatedly performing power multiplication.

In the example described in the foregoing, the size $M_j$ of the blocks may be constant for all blocks or, alternatively, some or all of the blocks may have different sizes. However, the secret key vector $g_{et}$ is derived in relation to the 1st block, so that when that size is made constant for all blocks, the secret becomes large for the 1st block. Therefore, it is preferred to make the size of the 1st block smaller than the sizes of the other blocks. When $M_1$=1, in particular, the secrets distributed can be minimized and safety most enhanced.

The characteristic portions of the present invention are now described while making comparisons with the preceding invention described above. In the preceding invention, the personal secret random number $\beta_{ej}$ (j=1, 2, . . . , J) for an entity e is constant in each ID division vector (each block), and the value of the personal secret random number $\beta_{ej}$ for each component in each ID division vector of entity e is set the same. That being so, an attack is conceivable in the following manner; by subtracting those elements which are adjacent to each other inside each block, this personal secret random number $\beta_{ej}$ can be erased.

Thereupon, in the present invention, the personal secret random numbers in the division vectors (blocks) of entity e are not made constant, and different personal secret random numbers $\beta_{ej}^{(v)}$ (j=1, 2, . . . , J; v=0, 1, . . . , $2^{Mj}-1$) are allotted to the components in the division vectors of entity e respectively.

In the present invention, at the centers 1, the following public keys and secret keys are prepared, and the public keys are disclosed.

| | | |
|---|---|---|
| Public key | N | N = PQ |
| | J | Number of ID vector division blocks |
| | $M_j$ | Size of divided ID vector (where j = 1, 2, . . . , J) |
| | L | Size of ID vector (L = $M_1$ + $M_2$ + . . . + $M_J$) |
| | T | Degree of exponent portion |
| Secret key | P, Q | Large prime numbers |
| | g | Maximum generation origin with modulo N |
| | $H_j$ | Symmetrical $2^{Mj} \times 2^{Mj}$ matrix formed of random numbers |
| | $\alpha_e$ | Personal secret random number of entity e (where gcd ($\alpha_e$, $\lambda$(N)) = 1 and $\lambda(\cdot)$ is Carmichael function) |
| | $\beta_{ej}^{(v)}$ | Personal secret random number of entity e (v = 0, 1, . . . , $M_j$ - 1) (where $\gamma_{eR1} + \gamma_{eR2} + \ldots + \gamma_{eRK} = n\lambda(N)$ and n is an integer). All of the divided blocks, J in number, are divided into K sets, each set containing one or a plurality of blocks. That is, $R_K$ is a partial set of the universal set (U) having as members the natural numbers (maximum natural number is J), $R_p \cap R_q$ is an empty set for any p and q, and $R_1 \cup R_2 \cup \ldots \cup R_K$ is the universal set (U). Also, $\gamma_{eRk}$ is made a constant value, obtained by calculating the personal secret random numbers and correction terms in each component in the block (division vector) corresponding to $R_k$.) |

Needless to say, the way the partial set $R_K$ is made may be different in each entity. Also, the number of members in one partial set $R_K$ may be any number.

As in the preceding invention, the ID vector for entity e (i.e. vector $I_e$) is divided, as in formula 1 given earlier. Then the centers 1, using the prepared secret key(s), computes J secret key vectors $s_{ej}$ (j=1, 2, . . . , J) corresponding to J ID division vectors of entity e. In the present invention, however, a different random number is used to the component in the secret key vector $s_{ej}$ distributed to the entity e from the j'th center. The vectors $s_{ej}$ for the second and subsequent blocks of the entity e are given in generalized form by the following formulas 12-2, 12-3, . . . , 12-J. In the example given below, the size of each block is made $M_j$=1. The formulas 12-2 and 12-J in the present invention correspond, respectively, to formulas 2-2 and 2-J in the preceding invention.

$$\vec{s_{e2}}(\beta_2^{(0)}, \beta_2^{(1)}) = (\alpha_e k_{e21}^{(2)} + \beta_{e2}^{(0)}, \alpha_e k_{e22}^{(2)} + \beta_{e2}^{(1)}) \tag{12-2}$$

$$\vec{s_{e3}}(\beta_3^{(0)}, \beta_3^{(1)}) = (\alpha_e k_{e31}^{(2)} + \beta_{e3}^{(0)}, \alpha_e k_{e32}^{(3)} + \beta_{e3}^{(1)}) \tag{12-3}$$

$$\vdots$$

$$\vec{s_{ej}}(\beta_j^{(0)}, \beta_j^{(1)}) = (\alpha_e k_{ej1}^{(j)} + \beta_{ej}^{(0)}, \alpha_e k_{ej2}^{(j)} + \beta_{ej}^{(1)}) \tag{12-J}$$

In cases where this is done, the sum of the random numbers $\beta_{e2} + \beta_{e3} + \ldots + \beta_{eJ}$ can take a value in $2^{J-1}$ different ways. Therefore, even if J is comparatively small, e.g., J=21, it becomes $2^{20} \approx 10^6$, thus constituting a great obstacle in practice. That being so, consideration was given to converting the random number values $\beta_{e,i} + \ldots + \beta_{e,i+S-1}$ that can take $2^S$ different values for every S blocks, to a constant value.

The ID vectors on the field $F_2$ are generally expressed as given in formula 13 below.

$$ID_2 = (b_1, b_2, \ldots, b_J) \quad (13)$$

Here, we assume that S=2, and consider 2-bit pairs. Any pair may be represented generally as $(b_i, b_j)$. Also, it is assumed that the pairs are selected not to overlap each other and constitute the entirety. The entity e is informed of pair combinations (pattern of $R_k$).

Then, for the partial sum $S_{bibj}$, a correcting term $C_{bibj}$ is added as described below in order to convert the random numbers to the constant value $\gamma_{eij}$. However, for all of the pairs (i,j), $\gamma_{eij}$ is determined such that adding $\gamma_{eij}$ results in $\lambda(N)$. First, four values are given for $S_{bibj}$ and $C_{bibj}$ from the values of $(b_i, b_j)$, respectively, by formulas 14 and 15 below.

$$S_{00} = \alpha_e k_{ei1}^{(i)} + \alpha_e k_{ej1}^{(j)} + \beta_{e_i}^{(0)} + \beta_{e_j}^{(0)}$$

$$S_{01} = \alpha_e k_{ei1}^{(i)} + \alpha_e k_{ej2}^{(j)} + \beta_{e_i}^{(0)} + \beta_{e_j}^{(1)}$$

$$S_{10} = \alpha_e k_{ei2}^{(i)} + \alpha_e k_{ej1}^{(j)} + \beta_{e_i}^{(1)} + \beta_{e_j}^{(0)}$$

$$S_{11} = \alpha_e k_{ei2}^{(i)} + \alpha_e k_{ej2}^{(j)} + \beta_{e_i}^{(1)} + \beta_{e_j}^{(1)} \quad (14)$$

$$C_{00} = \gamma_{eij} - (\beta_{e_i}^{(0)} + \beta_{e_j}^{(0)})$$

$$C_{01} = \gamma_{eij} - (\beta_{e_i}^{(0)} + \beta_{e_j}^{(1)})$$

$$C_{10} = \gamma_{eij} - (\beta_{e_i}^{(1)} + \beta_{e_j}^{(0)})$$

$$C_{11} = \gamma_{eij} - (\beta_{e_i}^{(1)} + \beta_{e_j}^{(1)}) \quad (15)$$

Accordingly, $S_{bibj} + C_{bibj}$ is given by formula 16 below.

$$S_{00} + C_{00} = \alpha_e k_{ei1}^{(i)} + \alpha_e k_{ej1}^{(j)} + \gamma_{eij}$$

$$S_{01} + C_{01} = \alpha_e k_{ei1}^{(i)} + \alpha_e k_{ej2}^{(j)} + \gamma_{eij}$$

$$S_{10} + C_{10} = \alpha_e k_{ei2}^{(i)} + \alpha_e k_{ej1}^{(j)} + \gamma_{eij}$$

$$S_{11} + C_{11} = \alpha_e k_{ei2}^{(i)} + \alpha_e k_{ej2}^{(j)} + \gamma_{eij} \quad (16)$$

For the 1st block, as in the preceding invention, T+1 secret key vectors $g_{et}$ (t=0, 1, 2, ..., T) are computed. Then one center 1 sends the T+1 secret key vectors $g_{et}$ (t=0, 1, 2, ..., T) for the 1st block of entity e to entity e in secret, and the remaining J−1 centers 1 send J−1 secret key vectors $s_{ej}$ (j=2, 3, ..., J) for the second and subsequent blocks of entity e to entity e in secret.

Entity e, as in the preceding invention, for the 1st block, selects, from among its own T+1 secret key vectors $g_{et}$, the vector $g_{et}$ [vector $I_{m1}$] for the component corresponding to the vector $I_{m1}$ that is the ID division vector for entity m. Entity m is an entity with whom entity e communicates with. Next, entity e, for each of the 2nd, 3rd, ..., J'th blocks, selects, from among its own secret key vector $s_{ej}$, the vector $s_{ej}$ [vector $I_{mj}$] for the component corresponding to the vector $I_{mj}$ that is the ID division vector for entity m, and finds the sum $y_{em}$ of all of these on the integer ring.

Then, as in the preceding invention, the common key $K_{em}$ is found with modulo N. When this is being done, the personal secret random number $\alpha_e$ is eliminated by multiplication with the inverse element thereof, and in the present invention, it is established that $\gamma_{eR1} + \gamma_{eR2} + \ldots + \gamma_{eRK} = n\lambda(N)$, wherefore the personal secret random number $\beta_{ej}^{(v)}$ is eliminated by these additions.

When secret keys have been generated in this manner, the present invention is resilient to collusive attack. Why that is so is now explained. When $\gamma_{eij}$ is eliminated from formula 16 given earlier, the relationships represented in formula 17 below are obtained, using suitable constants for $d_{e1}$ to $d_{e3}$. In formula 17, there are clearly two independent equations.

$$\alpha_e k_{ei1}^{(i)} - \alpha_e k_{ei2}^{(i)} = d_{e1}$$

$$\alpha_e k_{ej1}^{(j)} - \alpha_e k_{ej2}^{(j)} = d_{e2}$$

$$\alpha_e k_{ei1}^{(i)} - \alpha_e k_{ei2}^{(i)} + \alpha_e k_{ej1}^{(j)} - \alpha_e k_{ej2}^{(j)} = d_{e3} \quad (17)$$

Let it be assumed here that $N_T$ persons collude to find out the elements $k_{ei1}^{(i)}$, $k_{ei2}^{(i)}$, $k_{ej1}^{(j)}$, and $k_{ej2}^{(j)}$ in a matrix relating to the pair $(b_i, b_j)$. There are $4N_T+2$ independent equations, for which the number of unknowns, even assuming that $\alpha_e$ is a constant, becomes $4N_T+4$; the number of unknowns exceeds the number of equations. As a result, the elements $k_{ei1}^{(i)}$, $k_{ei2}^{(i)}$, $k_{ej1}^{(j)}$, and $k_{ej2}^{(j)}$ are not revealed.

The security of the scheme of the present invention is now described. It is known that a necessary condition for a secure ID-NIKS is that it not be possible to separate the secret key generation functions and key sharing function in polynomial time. That this scheme satisfies these necessary conditions for safety is demonstrated below.

Secret Key Generation Functions:

The scheme of the present invention has the secret key generation functions, J in number, indicated in formulas 18 and 19.

$$f_1(\vec{x}) = g^{\alpha_{e1} H_1[\vec{x}]} (j=1) \quad (18)$$

$$f_j(\vec{x}) = \alpha_{ej} H_j[\vec{x}] (j=2, \ldots, J) \quad (19)$$

When H is any symmetrical matrix, the reference function [·], as indicated in formulas 20 and 21, is clearly inseparable.

$$H[\vec{x} + \vec{y}] \neq H[\vec{x}] + H[\vec{y}] \quad (20)$$

$$H[\vec{x} + \vec{y}] \neq H[\vec{x}] \cdot H[\vec{y}] \quad (21)$$

Accordingly, the J secret key generation functions expressed in formulas 18 and 19 are inseparable, as indicated in formula 22 below.

$$f_j(\vec{x} + \vec{y}) \neq f_j(\vec{x}) \circ f_j(\vec{y}) (j=1, 2, \ldots, J) \quad (22)$$

Key Sharing Function:

The key sharing function in this scheme is expressed in formula 23 below.

$$F(\vec{x}, \vec{y}) = g^{H_1[\vec{x}][\vec{y}] \ldots H_K[\vec{x}^K][\vec{y}^K]} \quad (23)$$

As with in the case of the secret key generation functions, the key sharing function expressed in formula 23 is inseparable, as indicated in formula 24 below.

$$F(\vec{a}, \vec{x} + \vec{y}) \neq F(\vec{a}, \vec{x}) \circ F(\vec{a}, \vec{y}) \quad (24)$$

However, in the scheme described above, the form of $\alpha_e (k_{ei1}^{(j)} - k_{ei2}^{(i)})$ and $\alpha_e (k_{ej1}^{(j)} - k_{ej2}^{(j)})$ is revealed. That being so, a procedure is described below wherewith forms such as $\alpha_e (k_{ei1}^{(i)} - k_{ei2}^{(i)})$ are not revealed.

With this procedure, the divided ID vector is configured with codewords of a correction code. For example, for two continuous components $b_{2n}$ and $b_{2+1}$ (n=1, 2, ..., J) in a two-dimensional ID vector $ID_2$, a component $c_n'$ that satisfies formula 25 below is inserted after the $b_{2n+1}$ component, so that the codewords are configured as $b_{2n}$, $b_{2n+1}$, $c_n'$. The vector after the insertion of $c_n'$ is expressed as $ID_2'$, as in formula 26 below.

$$b_{2n}+b_{2n+1}=c_n' \pmod 2 \quad (25)$$

$$ID_2'=(b_1, b_2, b_3, c_1', b_4, b_5, c_2', \ldots, b_{2J}, b_{2J+1}, c_J') \quad (26)$$

$\{(b_{2n}, b_{2+1}, c_n')\}$ becomes a linear code having the code length n=3, the number of information symbols k=2, and the minimum distance d=2. Accordingly, by the same argument as in the case of the scheme described earlier, formula 27 below is derived if $d_{e4}$ to $d_{e6}$ are suitable constants. Among these there are only two independent equations. Hence, it is clear that the individual $\alpha_e$ $(k_{ei1}^{(i)}-k_{ei2}^{(i)})$ etc. are not revealed.

$$\alpha_e(k_{ei1}^{(i)}-k_{ei2}^{(i)})+\alpha_e(k_{ej1}^{(j)}-k_{ej2}^{(j)})=d_{e4}$$

$$\alpha_e(k_{ei1}^{(i)}-k_{ei2}^{(i)})+\alpha_e(k_{ek1}^{(k)}-k_{ek2}^{(k)})=d_{e5}$$

$$\alpha_e(k_{ej1}^{(j)}-k_{ej2}^{(j)})+\alpha_e(k_{ek1}^{(k)}-k_{ek2}^{(k)})=d_{e6} \quad (27)$$

Thus, by combining the random number pluralizing scheme described above, wherein the personal secret random number is made different for each component in the divided ID vector, with such a divided ID vector producing scheme as this wherewith the divided ID vectors are configured with codewords of a correction code, it is possible to build a more secure cryptographic communications system.

Figure 3:
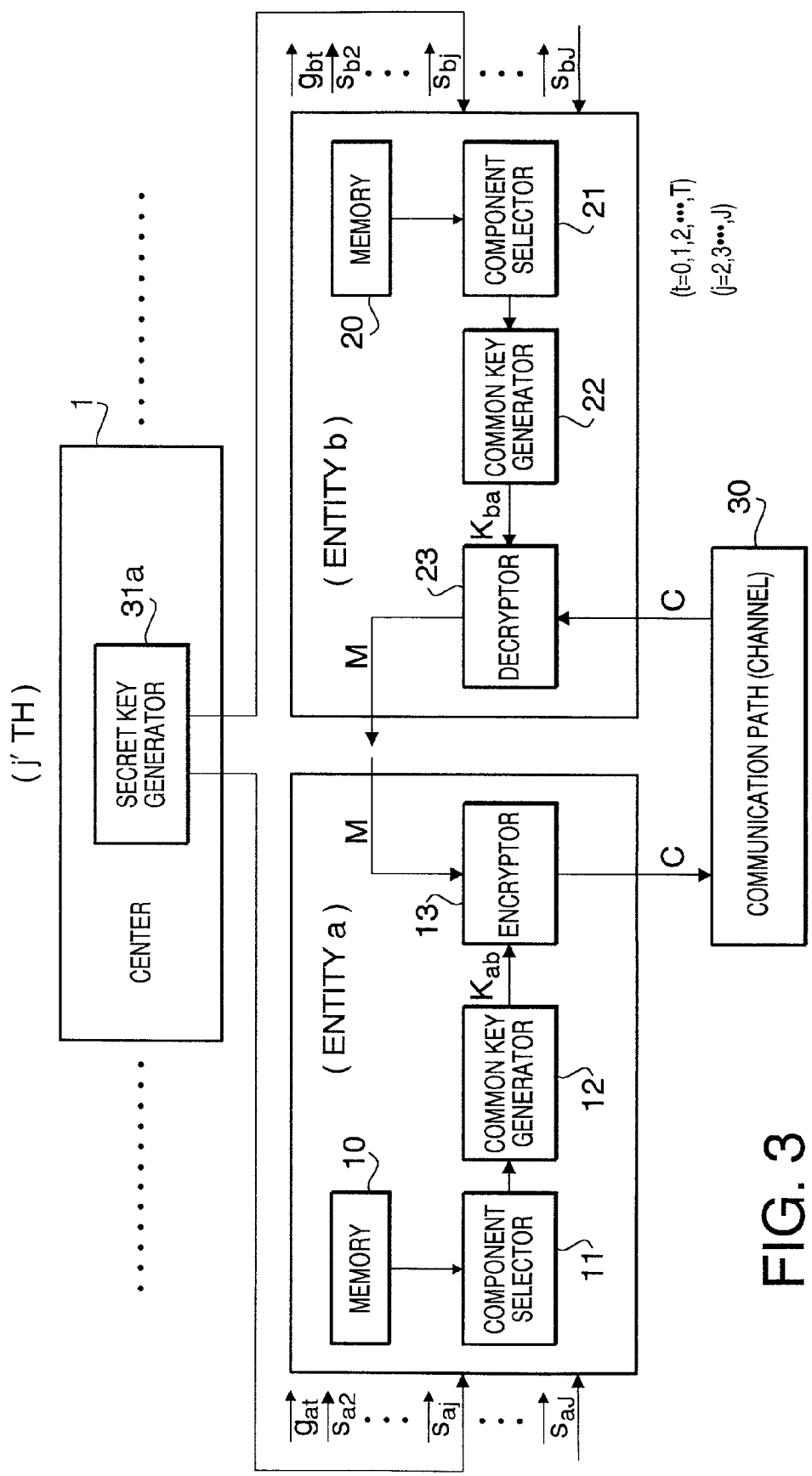
FIG. 3 schematically illustrates how information is communicated between two entities in the communications system shown in FIG. 1.

Next, the communication of information between entities in the cryptographic system described in the foregoing is described. FIG. 3 is a model diagram showing how information is communicated between two entities a and b. In the illustrated example, entity a enciphers a plaintext (message) M to a ciphertext C and sends that to entity b, whereupon entity b deciphers that ciphertext C to the original plaintext (message) M.

The 1st center 1 is equipped with a secret key generator 31a for computing the secret key vectors $s_{a1}$ and $s_{b1}$ peculiar to the entities a and b, and T+1 secret key vectors $g_{at}$, $g_{bt}$ (t=0, 1, 2, . . . , T). When registration is requested by the entities a and b, the center 1 produces the secret key vectors $g_{at}$ and $g_{bt}$ for the entities a and b and sends these secret key vectors to entities a and b respectively.

The j'th center 1 (j=2, 3, . . . , J) is also equipped with a secret key generator 31a for computing the secret key vectors $s_{aj}$ and $s_{bj}$ for the entities a and b. When registration is requested by the entities a and b, the j'th center 1 prepares the secret key vectors $s_{aj}$ and $s_{bj}$ for the entities a and b and sends them to entities a and b respectively.

Entity a is equipped with a memory 10 for storing the secret key vectors $g_{at}$ (t=0, 1, 2, . . . , T) and $s_{aj}$ (j=2, 3, . . . , J) sent from the centers 1 in table form, a component selector 11 for selecting, from among those secret key vectors, the vectors $g_{at}$ [vector $I_{b1}$] (t=0, 1, 2, . . . , T) and the vectors $s_{aj}$ [vector $I_{bj}$] (j=2, 3, . . . , J) that are components corresponding to entity b, a common key generator 12 for generating the common key $K_{ab}$ with entity b wanted by entity a, using these selected components, and an encryptor 13 for enciphering the plaintext (message) M to ciphertext C, using the common key $K_{ab}$, and outputting that to a communication path (channel) 30.

Entity b is equipped with a memory 20 for storing the secret key vectors $g_{bt}$ (t=0, 1, 2, . . . , T) and $s_{bj}$ (j=2, 3, . . . , J) sent from the centers 1 in table form, a component selector 21 for selecting, from among those secret key vectors, the vectors $g_{bt}$ [vector $I_{a1}$] (t=0, 1, 2, . . . , T) and the vectors $s_{bj}$ [vector $I_{aj}$] (j=2, 3, . . . , J) that are components corresponding to entity a, a common key generator 22 for generating the common key $K_{ba}$ with entity a wanted by entity b, using these selected components, and a decryptor 23 for deciphering the ciphertext C input from the communication path 30 to the original plaintext M, using the common key $K_{ba}$, and outputting the plaintext M.

When information is to be sent from entity a to entity b, first, the secret key vectors $g_{at}$ (t=0, 1, 2, . . . , T) and $s_{aj}$ (j=2, 3, . . . , J) prepared by the centers 1 and stored in the memory 10 beforehand are read out to the component selector 11. Then, in the component selector 11, the vector $g_{at}$ [vector $I_{b1}$] (t=0, 1, 2, . . . , T) and the vector $s_{aj}$ [vector $I_{bj}$] (j=2, 3, . . . , J), which are the components for entity b, are selected and sent to the common key generator 12. In the common key generator 12, the common key $K_{ab}$ is found according to formula 11 using those components, and sent to the encryptor 13. In the encryptor 13, this common key $K_{ab}$ is used to encrypt the plaintext M to the ciphertext C, and the ciphertext C is sent over the communication path 30.

The ciphertext C sent over the communication path 30 is input to the decryptor 23 of entity b. The secret key vectors $s_{bj}$ (j=2, 3, . . . , J) and $g_{bt}$ (t=0, 1, 2, . . . , T) prepared by the centers 1 and stored beforehand in the memory 20 are read out to the component selector 21. Then, in the component selector 21, the vector $g_{bt}$ [vector $I_{a1}$] (t=0, 1, 2, . . . , T) and the vector $s_{bj}$ [vector $I_{aj}$] (j=2, 3, . . . , J), which are the components for entity a, are selected and sent to the common key generator 22. In the common key generator 22, the common key $K_{ba}$ is found according to formula 11 using those components, and sent to the decryptor 23. In the decryptor 23, this common key $K_{ba}$ is used to decipher the ciphertext C to the plaintext M.

In an example like this, centers are established in a plurality, and each center generates a key corresponding to one unit of divided ID information for an entity, wherefore no one center will possess the secrets of all of the entities, and none of the centers becomes a "big brother." Also, secret key vectors peculiar to respective entities are pre-stored in memories of the entities, wherefore the time required for common key generation can be reduced.

Figure 4:
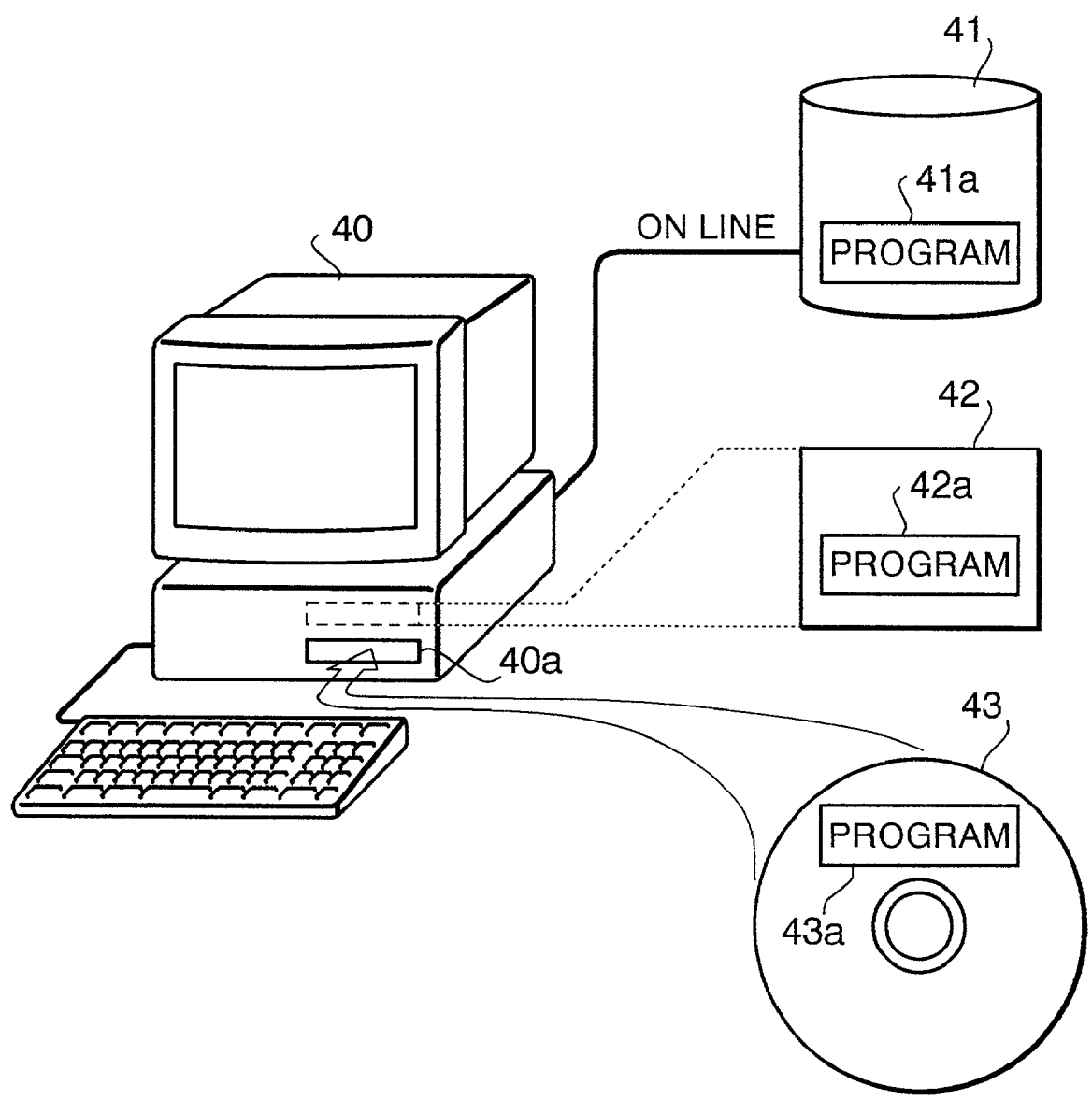
FIG. 4 illustrates various forms of recording media (computer-readable media) according to the first embodiment.

Referring to FIG. 4, illustrated is a diagram schematically illustrating recording media (computer-readable media) in the present invention. The program to be executed here includes division routines for dividing specifying information (ID information) for each entity and obtaining ID division vectors, and secret key generation routines for finding the secret key vectors $s_{ej}$ and $g_{et}$ for each entity, and is recorded on the recording medium described below. A computer 40 is also provided at each center.

In FIG. 4, a recording medium 41 connected online with the computer 40 is established using a WWW (world wide web) server computer, for example, installed at a location that is remote from the computer 40, and a program 41a like that described above is recorded on the recording medium 41. The program 41a read out from the recording medium 41 controls the computer 40 and thereby executes the division routines and secret key generation routines described above at each center.

A recording medium 42 provided internally in the computer 40 may be an internally installed hard disk drive or ROM. A program 42a like that described above is recorded on that recording medium 42. The program 42a read out from that recording medium 42 controls the computer 40, and thereby executes the division routines and secret key generation routines described above at each center.

A recording medium 43 used by loading into a disk drive 40a provided in the computer 40 is a portable medium such as an optico-magnetic disk, CD-ROM, or flexible disk. A program 43a like that described above is recorded on that recording medium 43. The program 43a read out from that recording medium 43 controls the computer 40, and thereby executes the division routines and secret key generation routines described above at each center.

It should be noted here that the foregoing description deals with a case where the present invention is applied to the secret key generation scheme described in Japanese Patent Application No. H11-59049/1999. Needless to say, however, the present invention can be similarly applied also to other ID-NIKS schemes (such as the scheme disclosed in Japanese Patent Application No. H11-16257/1999, for example) which use divided ID vectors and a personal secret random number β to generate secret keys.

Second Embodiment

A second embodiment of the present invention is now described.

Figure 5:
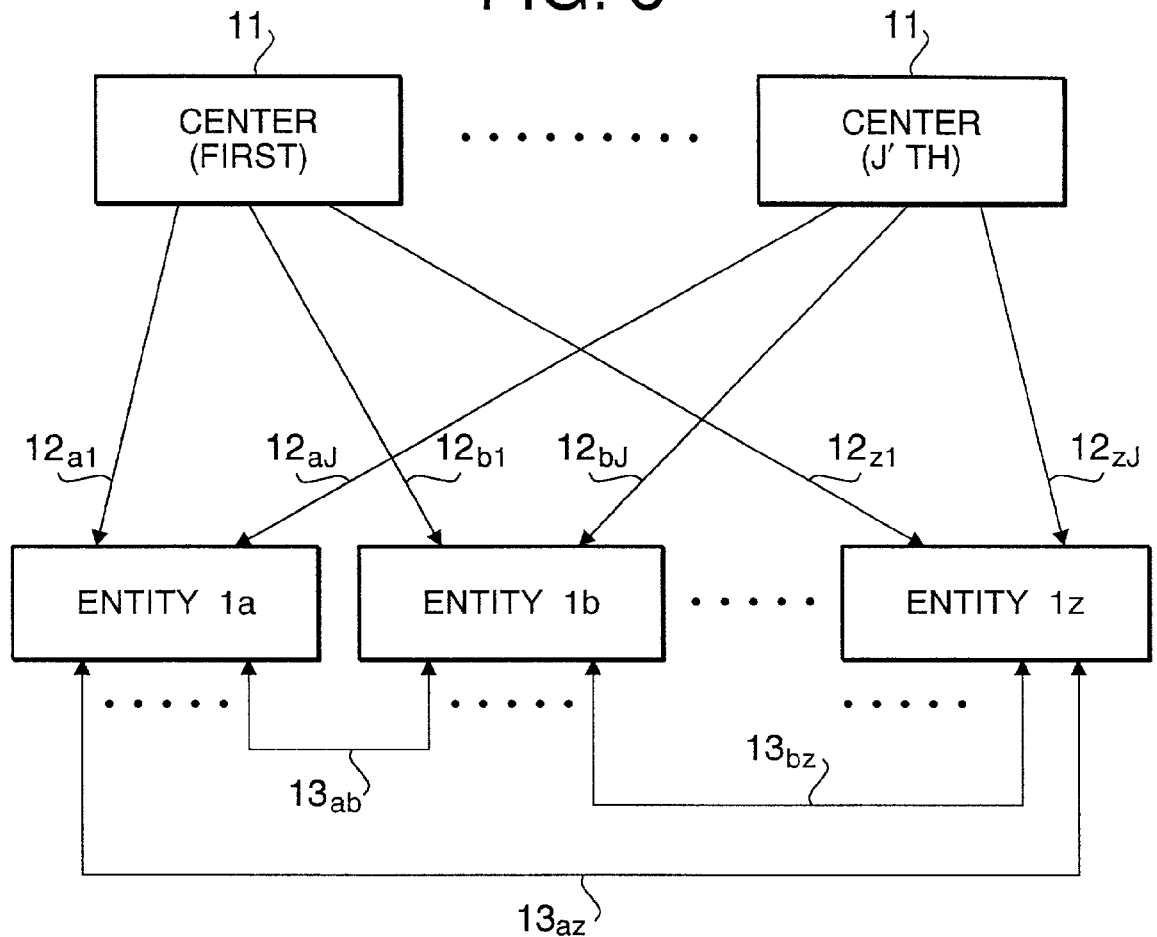
FIG. 5 illustrates a configuration of a cryptographic communications system according to the second embodiment of the present invention.

Referring to FIG. 5, illustrated is a model diagram representing the configuration of a cryptographic communications system according to the second embodiment of the present invention. Centers 11 that can be trusted to maintain the confidentiality of information are established in a plurality (J in number), which centers 11 may be public institutions in society, for example.

These centers 11 are connected to a plurality of entities $1a, 1b, \ldots, 1z$ that are the users employing this cryptosystem by secret communication paths (channel) $12_{a1}, \ldots, 12_{aJ}, 12_{b1}, \ldots, 12_{bJ}, \ldots, 12_{z1}, \ldots, 12_{zJ}$. Secret key information is sent from the centers 11 via these secret communication paths to the entities $1a, 1b, \ldots, 1z$. Communication paths $13ab, 13az, 13bz$, etc., are also provided between pairs of entities. Ciphertext obtained by encrypting communications information is sent back and forth between entities via these communication paths $13ab$, $13az$, $13bz$, etc.

Figure 6:
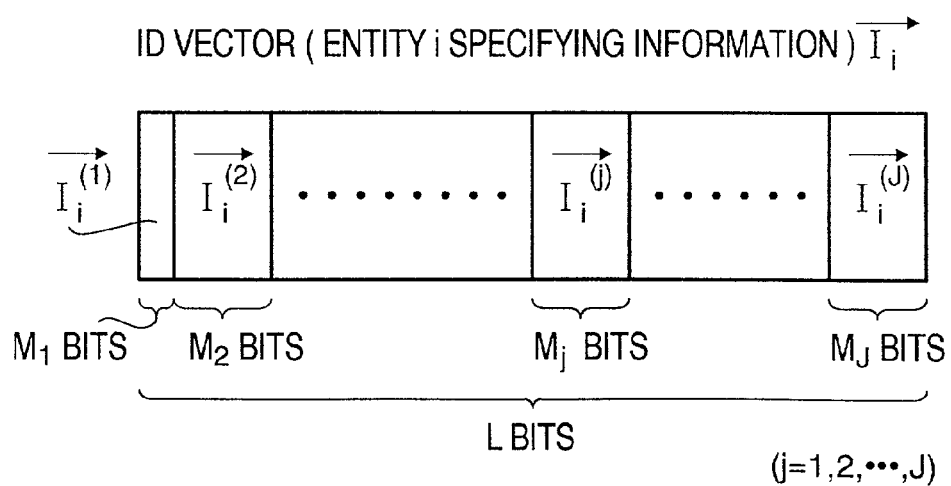
FIG. 6 illustrates division of entity's ID vector according to the second embodiment.

ID vectors that are specifying information indicating, for example, the names and addresses of entities are made L-dimension binary vectors, and each of these ID vectors is divided into J blocks of size $M_1, M_2, \ldots, M_J$ as diagrammed in FIG. 6. The ID vector for entity i (i.e. vector $I_i$), for example, is divided as indicated in formula 28 below. Here, the vectors $I_i^{(j)}$ (j=1, 2, ..., J), that are divided specifying information, are called ID division vectors. If $M_j=M$, the sizes of all of the ID division vectors become equal. It is also possible to set $M_j=1$.

$$I_i = [\vec{I_i}^{(1)} | \vec{I_i}^{(2)} | \ldots | \vec{I_i}^{(J)}] \tag{28}$$

Preparatory Processing at Centers 11:

The centers 11 prepare public keys and secret keys as follows and disclose the public keys.

| | | |
|---|---|---|
| Public key | N | N = PQ |
| | J | Number of ID vector division blocks |
| | $M_j$ | Size of divided ID vector (where j = 1, 2, ..., K) |
| | L | Size of ID vector (L = $M_1 + M_2 + \ldots + M_J$) |
| | T | Degree of exponent portion |
| Secret key | P, Q | Large prime numbers |
| | g | Maximum generation origin with modulo N |
| | $H^{(j)}$ | Symmetrical $2^{M_j} \times 2^{M_j}$ matrix formed of random numbers |
| | vector $h_i^{(j)}$ | vector obtained by extracting from the matrix $H^{(j)}$ one row corresponding to vector $I_i^{(j)}$ |
| | vector $h_{R,i}^{(j)}$, vector $h_{L,i}^{(j)}$ | key division vector of entity i, vector $h_{R,i}^{(j)}$ + vector $h_{L,i}^{(j)}$ = vector $h_i^{(j)}$ |
| | $\alpha_i, \beta_i$ | Personal secret random numbers for entity i (where gcd ($\alpha_i$, λ(N)) = 1, gcd ($\beta_i$, λ(N)) = 1 and λ(·) is Carmichael function) |
| | $\gamma_i^{(j)}, c_i$ | Personal secret random numbers for entity i (where $\gamma_i^{(1)} + \gamma_i^{(2)} + \ldots + \gamma_i^{(J)} + c_i = \lambda(N)$) |
| | vector $\gamma_{R,i}^{(j)}$, vector $\gamma_{L,i}^{(j)}$ | random number division vector of entity i, vector $\gamma_{R,im}^{(j)}$ + vector $y_{L,im}^{(j)} = \gamma_i^{(j)}$ vector 1 for entity m (where vector 1 = (1, 1, ..., 1)) |

Entity Registration Processing:

When the centers 11 are requested by an entity i for registration, two types of secret vectors (J in number respectively), namely vectors $s_{R,i}^{(j)}$ and vectors $s_{L,i}^{(j)}$ corresponding to J ID division vectors of entity i using a prepared secret key(s) are computed according to formulas 29 and 30 below, and the resulting secret keys are distributed to entity i in secret.

$$\vec{s_{R,i}}^{(j)} \equiv \alpha_i(\vec{h_{R,i}}^{(j)} + \vec{\gamma_{R,i}}^{(j)})(\bmod \lambda(N)) \tag{29}$$

$$\vec{s_{L,i}}^{(j)} \equiv \beta_i(\vec{h_{L,i}}^{(j)} + \vec{\gamma_{L,i}}^{(j)})(\bmod \lambda(N)) \tag{30}$$

Furthermore, the centers 11 compute the secret keys represented in formula 31 below, numbering (T+1)(T+2)/2 (where p+q+r=T), and these secret keys are distributed to entity i in secret.

$$g_{i,pqr} = g^{a_i^p b_i^q c_i^r} \tag{31}$$

Here, $a_i$, $b_i$, and $c_i$ respectively satisfy the conditions noted below in formulas 32 to 34.

$$a_i \cdot \alpha_i \equiv 1(\bmod \lambda(N)) \tag{32}$$

$$b_i \cdot \beta_i \equiv 1(\bmod \lambda(N)) \tag{33}$$

$$\sum_{j=1}^{J} \gamma_i^{(j)} + c_i = \lambda(N) \tag{34}$$

Processing for Generating Common Key between Entities:

Entity i, for the 1st, 2nd, ..., J'th blocks (j=1, 2, ..., J), extracts, from its own secret key vectors $s_{R,i}^{(j)}$, components $s_{R,imj}^{(j)}$ corresponding to the ID division vectors $I_m^{(j)}$ for entity m (which components are called the $m_j$'th components in the interest of simplicity), and finds the $S_{R,im}$ on the integer ring for those extractions. Similarly, entity i extracts from its own secret key vectors $S_{L,i}^{(j)}$ components $s_{L,imj}^{(j)}$ corresponding to the ID division vectors $I_m^{(j)}$ for entity m, and finds the sum $S_{L,im}$ on the integer ring for those extractions. These sums $S_{R,im}$ and $S_{L,im}$ are indicated in formulas 35 and 36 below, respectively. In the interest of simplicity, these are established as in formulas 37 and 38 below.

$$S_{R,im} = \sum_{j=1}^{J} s_{R,i} m_j^{(j)} \tag{35}$$

$$= a_i X_{R,i} m$$

-continued $$S_{L,im} = \sum_{j=1}^{J} s_{L,i} m_j^{(j)} \quad (36)$$
$$= \beta_i X_{L,i} m$$

$$X_{R,i} m = \sum_{j=1}^{J} h_{R,i} m_j^{(j)} + \sum_{j=1}^{J} \gamma_{R,i} m_j^{(j)} \quad (37)$$

$$X_{L,i} m = \sum_{j=1}^{J} h_{L,i} m_j^{(j)} + \sum_{j=1}^{J} \gamma_{L,i} m_j^{(j)} \quad (38)$$

Then, computation is performed as in formula 39 below with modulo N to obtain the common key $K_{im}$. In formula 39, T is a comparatively small number, wherefore the exponential portion can be computed by sequentially repeating power multiplication. This common key $K_{im}$ is identical to the common key $K_{mi}$ found by entity m.

$$K_{im} \equiv \prod_{p+q+r=T} (g a_i^p b_i^q c_i^r)^{S_{R,im}^p S_{L,im}^q \frac{T!}{p!q!r!}} \quad (39)$$

$$\equiv \prod_{p+q+r=T} g \frac{T!}{p!q!r!} X_{R,im}^p X_{L,im}^q c_i^r$$

$$\equiv g \sum_{p+q+r=T} \frac{T!}{p!q!r!} X_{R,im}^p X_{L,im}^q c_i^r$$

$$\equiv g(X_{R,im} + X_{L,im} + c_i)^T$$

$$\equiv g \left\{ \sum_{j=1}^{J} \left( h_{R,im_j^{(j)}} + \gamma_{R,im_j^{(j)}} + h_{L,im_j^{(j)}} + \gamma_{L,im_j^{(j)}} \right) + c_i \right\}^T$$

$$\equiv g \left( \sum_{j=1}^{J} h_{i_j m_j^{(j)}} + \lambda(N) \right)^T$$

$$\equiv g \left( \sum_{j=1}^{J} h_{i_j m_j^{(j)}} \right)^T$$

$$\equiv K_{mi} (\bmod N)$$

With this equation, even if J and T are comparatively small values such as J=20 and T=8, the number of terms in the exponential portion of g increases explosively as 256×$10^8$. However, the number of secret keys to be distributed, which are obtained from formula 31, for realizing this need only be 45.

Although provision is made so that N=PQ (where P and Q are large prime numbers) in order to realize the security afforded by RSA encryption in the second embodiment, it is sufficient that this N be an integer. It should also be noted that provision may be made to establish N=P (where P is a large prime number) in order to realize the security afforded by the discrete logarithm problem. Furthermore, g is made the maximum generating element based on modulo N in order to generate many power multiplications to enhance security in this particular embodiment, but g may be any number so long as it is an integer prime with N.

In the second embodiment, a secret key to an entity is divided in two, and the trinomial theorem is used in order to realize a T-degree polynomial with the exponential part, but the number of divisions made in the secret keys distributed to entities is entirely discretionary. When that number of divisions is represented as k, then it is sufficient to use the k+1-nomial theorem.

Next, the security afforded by such a scheme is considered.

Security Against Separation Attack:

It is known that one necessary condition for a secure ID-NIKS is that it must not be possible to separate the secret key generation function and key sharing function in polynomial time. In this scheme, this necessary condition for security is clearly satisfied.

Security Afforded by Discrete Logarithm Problem:

Even when g has been revealed, the difficulty of resolving the discrete logarithm problem makes it very difficult to derive the personal secret keys $a_i$, $b_i$, and $c_i$ from formula 31. This is represented more rigorously in formula 40 below, where $\Delta p = p - p'$, $\Delta q = q - q'$, and $\Delta r = r - r'$.

$$g_{i,pqr} = g_{i,p'q'r'} a_i^{\Delta p} b_i^{\Delta q} c_i^{\Delta r} \quad (40)$$

Because $p+q+r=p'+q'+r'=T$, it should be apparent that formula 41 below wherein $\Delta p + \Delta q + \Delta r = 0$ is protected by the discrete logarithm problem.

Security Afforded by RSA Encryption:

Even when $a_i$ and $b_i$ have been revealed, it is very difficult to find the personal secret keys $\alpha_i$ and $\beta_i$ due to the security afforded by RSA encryption.

Safety Against Random-Number Substitution Attack:

In a key sharing scheme that employs divided specifying information of entities, in cases where part of an ID division vector of one entity is absolutely identical to that of another entity, it means that these entities use keys that are partially the same. The random-number substitution attack may be considered as a powerful attack method that recognizes that point. The preceding inventions are susceptible to such attack. With the scheme of the present invention, on the other hand, not only is a different personal secret random number $\gamma_i^{(j)}$ used for every entity, but, after dividing that into two vectors $\gamma_{R,i}^{(j)}$ and $\gamma_{L,i}^{(j)}$, they are multiplied by respectively different personal secret random numbers $\alpha_i$ and $\beta_i$ to generate the secret keys. Therefore, the random number(s) cannot be eliminated by the entities themselves. That being so, the random-number substitution attack that is established against the preceding inventions is not established against the scheme of the present invention.

Carmichael Function Safety:

When two different equations represent the same value, with the Carmichael function $\lambda(N)$ as the modulus, at the hands of colluding entities, $\lambda(N)$ will be revealed. The loop attack is a typical example of such an attack as this. With the scheme of the present invention, each of the secret keys is also divided into a plurality of portions (two portions in the embodiment) and then distributed to the entities, wherefore the common key is not generated until all of the computations indicated in formula 39 have been completed. Accordingly, at intermediate stages during the key sharing procedures, it is impossible to express the same value using two different equations. Therefore the Carmichael function $\lambda(N)$ is not revealed.

Numbers of Unknown Variables and Equations:

The relationship between the number of unknown variables and the number of equations distributed from the centers 11 is now considered. Each of the blocks of divided ID information has the same structure, so it will be sufficient to consider one block. Taking the case where $M_j=1$, four equations will be given, but four random number terms $\gamma_{im}$ will also be given. Similarly, four $\{h_{im}\}$ are given. To these are given three constraining conditions, wherefore five variables will be given. It is easy to verify in the case where $M_j \geq 2$ also that the number of unknown variables will always be greater than the number of equations. Accordingly, it is impossible for an attacker to determine all of the unknown variables.

Figure 7:
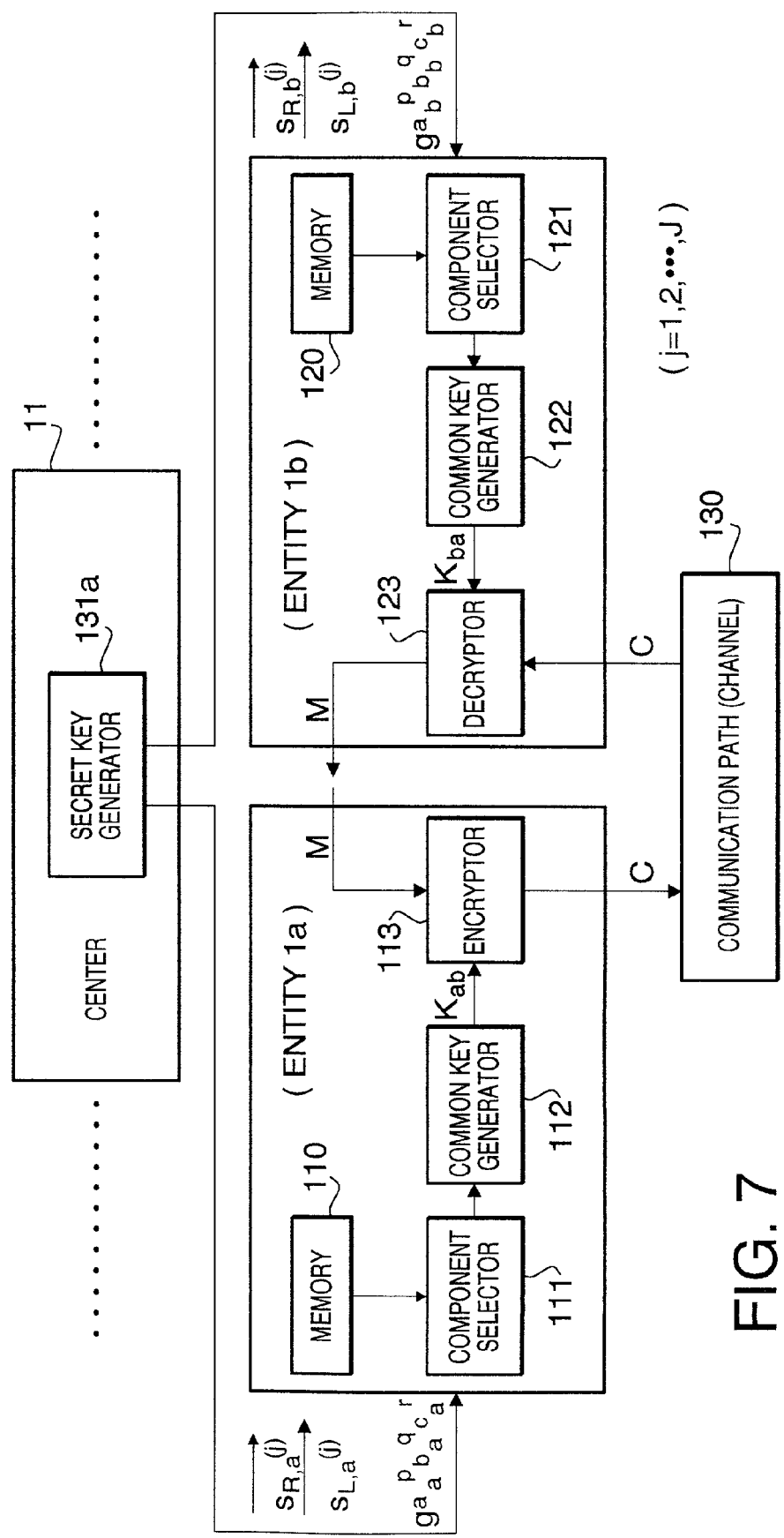
FIG. 7 depicts how information is communicated between two entities according to the second embodiment.

The communication of information between entities in the cryptographic system described in the foregoing is now described. FIG. 7 is a model diagram of how information is communicated between two entities $1a$ and $1b$. In the example diagrammed in FIG. 7, entity $1a$ enciphers a plaintext (message) M to ciphertext C and sends that to entity $1b$, whereupon entity $1b$ deciphers that ciphertext C back to the original plaintext (message) M.

The j'th center 11 (j=1, 2, 3, ..., J) is provided with a secret key generator $131a$ for computing secret key vectors $s_{R,a}^{(j)}$ and $s_{L,a}^{(j)}$ and the secret key vectors $s_{R,b}^{(j)}$ and $s_{L,b}^{(j)}$ peculiar to the entities $1a$ and $1b$ respectively according to formulas 29 and 30. The secret key generator $131a$ of a certain center 11 also computes secret keys peculiar to the entities $1a$ and $1b$ as indicated in formula 31. When registration is requested from the entities $1a$ and $1b$, the centers 11 send these secret keys to the entities $1a$ and $1b$ respectively.

Entity $1a$ is provided with a memory 110 wherein the secret keys sent from the centers 11 are stored in table form, a component selector 111 for selecting components corresponding to entity $1b$ from among those secret keys, a common key generator 112 for generating the common key $K_{ab}$ with entity $1b$ wanted by entity $1a$ using the secret key represented in formula 31 and the components selected, and an encryptor 113 for enciphering the plaintext (message) M to ciphertext C, using the common key $K_{ab}$, and outputting that to a communication path (channel) 130.

Entity $1b$ is also provided with a memory 120 wherein the secret keys sent from the centers 11 are stored in table form, a component selector 121 for selecting components corresponding to entity $1a$ from among those secret keys, a common key generator 122 for generating the common key $K_{ba}$ with entity $1a$ wanted by entity $1b$ using the secret key represented in formula 31 and the components selected, and a decryptor 123 for deciphering the ciphertext C input from the communication path 30 to the original plaintext M, using the common key $K_{ba}$, and outputting the plaintext M.

When information is to be sent from entity $1a$ to entity $1b$, first, the secret keys prepared by the centers $11$ as represented in formulas 29 and 30 and stored beforehand in the memory 110 are read out to the component selector 111. Then, in the component selector 111, the components corresponding to entity $1b$ are selected and sent to the common key generator 112. In the common key generator 112, the common key $K_{ab}$ is found according to formulas 35, 36, and 39, using those components and the secret key represented in formula 31, and sent to the encryptor 113. In the encryptor 113, this common key $K_{ab}$ is used to encrypt the plaintext M to the ciphertext C, and the ciphertext C is sent over the communication path 30.

The ciphertext C sent over the communication path 30 is input to the decryptor 123 of entity $1b$. The secret keys prepared by the centers 11 as represented in formulas 29 and 30 and stored beforehand in the memory 120 are read out to the component selector 121. Then, in the component selector 121, the components corresponding to entity $1a$ are selected and sent to the common key generator 122. In the common key generator 122, the common key $K_{ba}$ is found according to formulas 35, 36, and 39, using those components and the secret key represented in formula 31, and sent to the decryptor 123. In the decryptor 123, this common key $K_{ba}$ is used to decipher the ciphertext C to the plaintext M.

In an example like this, centers are established in a plurality, and each center generates a secret key corresponding to one unit of divided ID information for an entity, wherefore no one center will possess the secrets of all of the entities, and none of the centers becomes a "big brother." Also, secret key vectors peculiar to each entity are pre-stored in memories of the entity, wherefore the time required for common key generation can be short.

In the scheme described in the foregoing (hereafter called the basic scheme), the random number portion is not eliminated until it is joined with $c_i$ in the exponential part, wherefore extremely strong security can be realized. In the following, a modification will be described, which eliminates this $c_i$. Safety will be somewhat sacrificed as compared with the basic scheme, but a simpler scheme of the present invention is thereby realized, wherein the emphasis is placed on the practical aspect of being able to sharply reduce the number of secrets distributed to the entities.

Preparatory Processing at Centers 11:

The centers 11 prepare public keys and secret keys and disclose the public keys as in the basic scheme. However, since no personal secret random number $c_i$ is used, $\gamma_i^{(j)}$ satisfies formula 42 below. In other words, this simplified scheme corresponds to the case where $c_i=0$ is set in the basic scheme.

$$\gamma_i^{(1)}+\gamma_i^{(2)}+\ldots+\gamma_i^{(J)}\equiv\lambda(N) \tag{42}$$

Entity Registration Processing:

When the centers 11 are requested by an entity i for registration, two types of secret vectors (J in number respectively), namely vectors $s_{R,i}^{(j)}$ and vectors $s_{L,i}^{(j)}$ corresponding J ID division vectors for entity I, are computed using a secret prepared key(s) according to formulas 43 and 44 below, and these computed secret keys are distributed to entity i in secret.

$$\vec{s}_{R,i}^{(j)}\equiv\alpha_i(\vec{h}_{R,i}^{(j)}+\vec{\gamma}_{R,i}^{(j)}) \pmod{\lambda(N)} \tag{43}$$

$$\vec{s}_{L,i}^{(j)}\equiv\beta_i(\vec{h}_{L,i}^{(j)}+\vec{\gamma}_{L,i}^{(j)}) \pmod{\lambda(N)} \tag{44}$$

Furthermore, the centers 11 compute the secret keys as represented in formula 45 below, numbering T+1 (p+q=T), and these secret keys are distributed to entity i in secret.

$$g_{i,pq}=g^{a_i^p b_i^q} \tag{45}$$

Here, $a_i$ and $b_i$ respectively satisfy the conditions noted below in formulas 46 and 47.

$$a_i\cdot\alpha_i\equiv 1 \pmod{\lambda(N)} \tag{46}$$

$$b_i\cdot\beta_i\equiv 1 \pmod{\lambda(N)} \tag{47}$$

Processing for Generating Common Key between Entities:

Entity i, in the same manner as in the basic scheme, for the 1st, 2nd, ..., J'th blocks (j=1, 2, ..., J), finds the sums $S_{R,im}$ and $S_{L,im}$ on the integer ring. Then, by performing computation according to formula 48 below with modulo N, entity i finds the common key $K_{im}$. In formula 48, T is a comparatively small number, wherefore the exponential part can be computed by sequentially repeating power multiplication. This common key $K_{im}$ coincides with the common key $K_{mi}$ found by entity m from its end.

$$K_{im}\equiv\prod_{p+q=T}(g^{a_i^p b_i^q})^{S_{R,im}^p \cdot S_{L,im}^q \cdot T_{C_p}} \tag{48}$$

-continued $$\equiv \prod_{p+q=T} gTC_p X_{R,im}^p X_{L,im}^q$$

$$\equiv g \sum_{p+q=T} TC_p X_{R,im}^p X_{L,im}^q$$

$$\equiv g(X_{R,im} + X_{L,im})^T$$

$$\equiv g\left\{\sum_{j=1}^{J} \left(h_{R,im_j^{(j)}} + \gamma_{R,im_j^{(j)}} + h_{L,im_j^{(j)}} + \gamma_{L,im_j^{(j)}}\right)\right\}^T$$

$$\equiv g\left(\sum_{j=1}^{J} h_{i_j m_j^{(j)}} + \lambda(N)\right)^T$$

$$\equiv g\left(\sum_{j=1}^{J} h_{i_j m_j^{(j)}}\right)^T$$

$$\equiv K_{mi}(\text{mod} N)$$

This simplified scheme is equivalent to the case where $c_i=0$ is set in the basic scheme, wherefore it is sufficient only to use the binomial theorem in order to realize a T-order polynomial at the exponential portion, and the number of secret keys distributed to the entities can be reduced from $(T+1)(T+2)/2$ to $T+1$. The security afforded by $c_i$ being eliminated first in the exponential part is not enjoyed, but in all other respects the security afforded is equivalent to that of the basic scheme.

Figure 8:
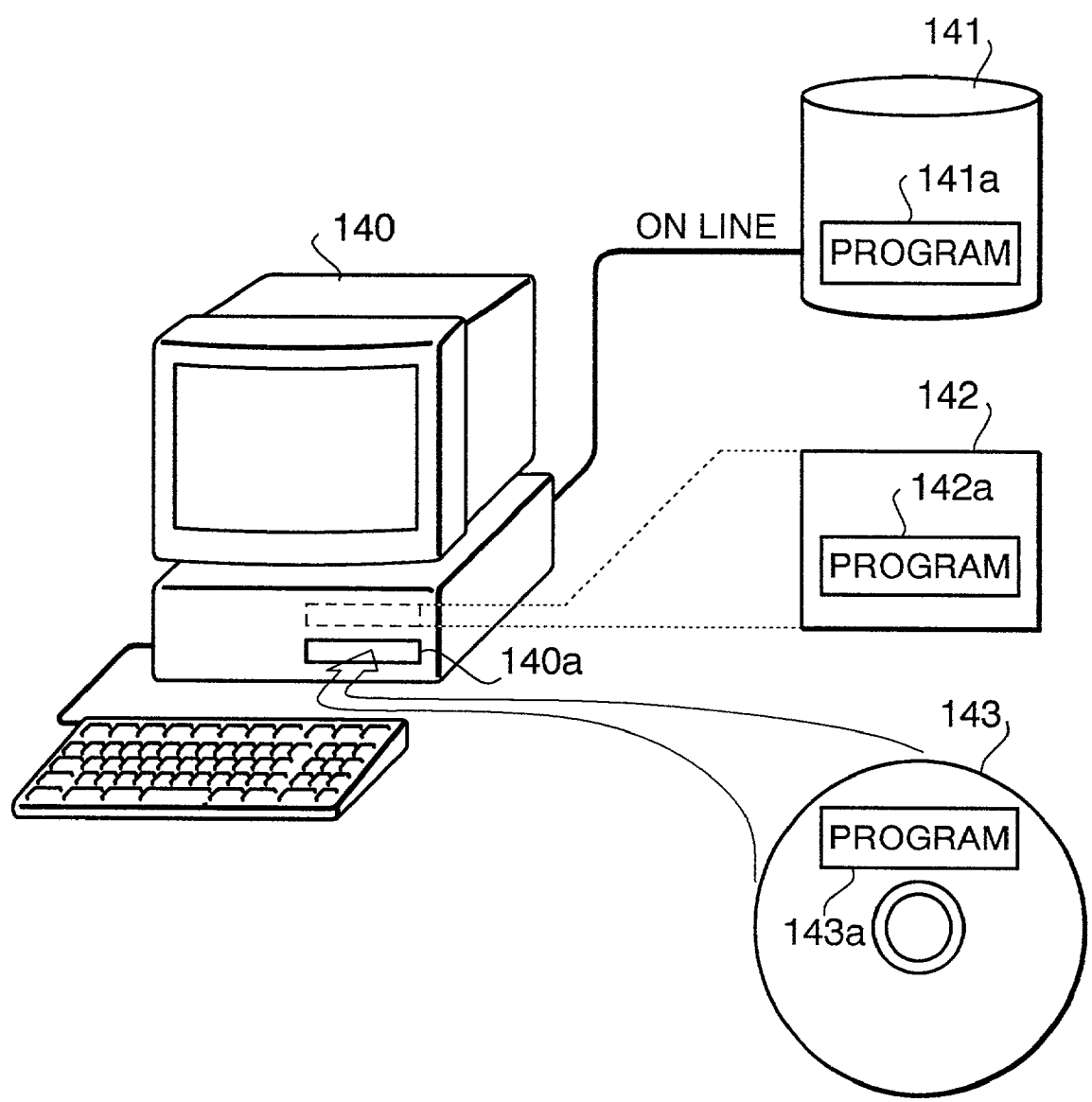
FIG. 8 illustrates various examples of recording media employable in the second embodiment.

Referring to FIG. 8, illustrated are examples of recording media according to the second embodiment of the present invention. The program to be executed here, which is recorded on recording media described below, includes processes for selecting components corresponding to entity m from among the secret key vectors represented in either formulas 29 and 30, or in formulas 43 and 44, sent to entity i from the centers, and processes for finding a common key $K_{im}$ using those selected components and the secret key represented in formula 31 or 45. A computer 140 is provided at each entity.

In FIG. 8, a recording medium 141 that connects the computer 140 online employs a WWW server computer, for example, located remotely from the site where the computer 140 is installed. A program 141a such as that described above is recorded on the recording medium 141. The program 141a read out from the recording medium 141 controls the computer 140 and thereby computes common keys at the entities for other entities to be communicated with.

A recording medium 142 provided internally in the computer 140 uses a built-in hard disk drive or ROM, for example, and a program 142a as described above is recorded on the recording medium 142. The program 142a read out from the recording medium 142 controls the computer 140 and thereby computes common keys at the entities for other entities to be communicated with.

A recording medium 143 loaded in a disk drive 140a of the computer 140 for use is a portable optical-magnetic disk, CD-ROM, or flexible disk, etc. A program 143a such as described above is recorded on the recording medium 143. The program 143a read out from the recording medium 143 controls the computer 140 and thereby computes common keys at the entities for other entities to be communicated with.

Thus, with the present invention, personal random numbers are not made constant in the division vectors, but rather different personal secret random numbers are established for the components inside those division vectors respectively. Therefore, protection against collusive attack can be strengthened.

With the present invention, furthermore, each division vector is configured with codewords of an error correcting code, wherefore, by combining such a division vector forming scheme with the scheme described in the foregoing for pluralizing the personal secret random number, even greater resilience against collusive attack can be realized.

With the present invention, moreover, the secret keys in divided specifying information blocks (divided ID vectors) are divided into a plurality of partial sums, different entity-specific random numbers are added to elements, and secret keys peculiar to each entity are generated. Therefore the problem in the preceding inventions of being weak against a random-number substitution attack by an adequate number of colluders can be eliminated, so that a powerful ID-NIKS encrypting scheme and cryptographic communications system can be provided.

The illustrated and described secrete key generation method, encryption method, cryptographic communications method, cryptographic communications system, and recording medium (computer readable medium) are disclosed in Japanese Patent Application Nos. 11-139285 and 11-200919 filed on May 19, 1999 and Jul. 14, 1999 respectively in JPO, and the instant application claims priority of these Japanese Patent Applications, the entire disclosures of which are herein incorporated by reference.

What is claimed is:

1. A secret key generation method wherein:
   secret keys peculiar to entities are generated by using division vectors indicating divided specifying information resulting from division of information specifying said entities into a plurality of blocks, and personal secret random numbers peculiar to said entities, set for each of said divided blocks;
   said personal secret random numbers are set with different values for each component in said division vectors;
   said secret keys are generated using said personal secret random numbers so set and said division vectors;
   when number of divided blocks of said division vectors is taken as J, sizes of said division vectors as $M_j$ (j=1, 2, ..., J), and personal secret random number for entity e as $\beta_{ej}^{(v)}$ (v=0, 1, ..., $M_j$−1), where $\beta$ is a random number, all J divided blocks are grouped into K groups, with one or a plurality of blocks in each group; and said secret keys satisfy $\gamma_{eR1}+\gamma_{eR2}+ \ldots +\gamma_{eRk}=n\lambda(N)$ where n is an integer, $\lambda(.)$ is a Carmichael function, and N=PQ (where P and Q are prime),
   where:
   $R_K$ is a partial set of universal set U having, as members, natural numbers up to J,
   $R_p \cap R_q$ is an empty set for any p and q, and $R_1 \cup R_2 \cup \ldots \cup R_K$ is said universal set U; and
   $\gamma_{eRk}$ is a constant value obtained by calculating personal secret random numbers and correction terms in each component in division vector corresponding to $S_k$.

2. A cryptographic communications system wherein:
   encrypting processing for encrypting plaintext that is information to be sent into ciphertext and decrypting processing for decrypting ciphertext sent back into original plaintext are performed reciprocally between a plurality of entities; having:
   a plurality of centers that generate secret keys peculiar to said entities, following the formulas given below, using divided specifying information resulting from division of information specifying said entities into a plurality of blocks, using row vectors corresponding to said divided specifying information for said entities, each of said row vectors being selected from a symmetrical matrix peculiar to each block, and the secret keys to the entities; and a plurality of entities each of which generates common keys employed in said encryption processing and said decryption processing, following the formulas given below, using components, contained in own secret key thereof, sent from said centers, that correspond to divided specifying information of entities to be communicated with, wherein computation formulas for generating said secret keys are as follows, $$\vec{s}_{R,i}{}^{(j)} \equiv \alpha_i(\vec{h}_{R,i}{}^{(j)} + \vec{\gamma}_{R,i}{}^{(j)}) (\bmod \lambda(N))$$

$$\vec{s}_{L,i}{}^{(j)} \equiv \beta_i(\vec{h}_{L,i}{}^{(j)} + \vec{\gamma}_{L,i}{}^{(j)}) (\bmod \lambda(N))$$

Secret keys $g^{a_i^p b_i^q c_i^r}$ numbering $(T+1)(T+2)/2$ where $p+q+r=T$, $a_i$, $b_i$, and $c_i$ satisfy following relationships $$a_i \cdot \alpha_i \equiv 1 (\bmod \lambda(N))$$

$$b_i \cdot \beta_i \equiv 1 (\bmod \lambda(N))$$

$$\sum_{j=1}^{J} \gamma_i^{(j)} + c_i = \lambda(N)$$

where vector $S_{R,i}{}^{(j)}$ and vector $S_{L,i}{}^{(j)}$ are two types of secret key corresponding to j'th divided specifying information for entity i (j=2, 3, . . . , J);

vector $h_{R,i}{}^{(j)}$, vector $h_{L,i}{}^{(j)}$ are key division vector of entity i, vector $h_{R,i}{}^{(j)}$+vector $h_{L,i}{}^{(j)}$=vector $h_i{}^{(j)}$;

vector $h_i{}^{(j)}$ is a vector obtained by extracting one row from a matrix $H^{(j)}$ corresponding to j'th divided specifying information for entity i;

$H^{(j)}$ is a symmetrical $2^{Mj} \times 2^{Mj}$ matrix formed of random numbers;

$M_j$ is size of j'th divided specifying information for entity i;

J is number of block divisions in specifying information for entity i;

$\alpha_i$, $\beta_i$ are personal secret random numbers for entity i;

where gcd $(\alpha_i, \lambda(N))=1$, gcd $(\beta_i, \lambda(N))=1$, and $\lambda(\cdot)$ is Carmichael function;

N is an integer;

$\gamma_i{}^{(j)}$, $c_i$ are personal secret random numbers for entity i where $\gamma i^{(1)} + \gamma i^{(2)} + \ldots + \gamma i^{(J)} + c_i = \lambda(N)$ vector $\gamma_{R,i}{}^{(j)}$, vector $\gamma_{L,i}{}^{(j)}$ are random number division vectors of entity i, vector $\gamma_{R,im}{}^{(j)}$+vector $\gamma_{L,im}{}^{(j)} = \gamma_i{}^{(j)}$ vector 1 for entity m (where vector 1=(1, 1, . . . , 1));

g is an integer mutually prime with N; and

T is degree of exponent portion, and wherein, $$K_{im} \equiv \prod_{p+q+r=T} (g a_i^p b_i^q c_i^r)^{S_{R,im}^p S_{L,im}^q \frac{T!}{p!q!r!}}$$

$$\equiv \prod_{p+q+r=T} g \frac{T!}{p!q!r!} X_{R,im}^p X_{L,im}^q c_i^r$$

-continued $$\equiv g \sum_{p+q+r=T} \frac{T!}{p!q!r!} X_{R,im}^p X_{L,im}^q c_i^r$$

$$\equiv g(X_{R,im} + X_{L,im} + c_i)^T$$

$$\equiv g \left\{ \sum_{j=1}^{J} \left( h_{R,im_j}^{(j)} + \gamma_{R,im_j}^{(j)} + h_{L,im_j}^{(j)} + \gamma_{L,im_j}^{(j)} \right) + c_i \right\}^T$$

$$\equiv g \left( \sum_{j=1}^{J} h_{i,jm_j}^{(j)} + \lambda(N) \right)^T$$

$$\equiv g \left( \sum_{j=1}^{J} h_{i,jm_j}^{(j)} \right)^T$$

$$\equiv K_{mi} (\bmod N)$$

where $S_{R,im}$ is a sum on the integer ring of components $S_{R,im_j}{}^{(j)}$ corresponding to the divided specifying information for entity m, extracted from the secret key vector $S_{R,i}{}^{(j)}$ for entity i, expressed as given below;

$S_{L,im}$ is a sum on the integer ring of components $S_{L,im_j}{}^{(j)}$ corresponding to the divided specifying information for entity m, extracted from the secret key vector $S_{L,i}{}^{(j)}$ for entity i, expressed as given below; and $K_{im}$ is a common key generated by one entity i for another entity m, and wherein, $$S_{R,im} = \sum_{j=1}^{J} s_{R,im_j}^{(j)}$$

$$= \alpha_i X_{R,im}$$

where . . .

$$X_{R,i} m = \sum_{j=1}^{J} h_{R,i} m_j^{(j)} + \sum_{j=1}^{J} \gamma_{R,i} m_j^{(j)}$$

$$S_{L,i} m = \sum_{j=1}^{J} s_{L,i} m_j^j$$

$$= \beta_i X_{L,i} m$$

where . . .

$$X_{L,i} m = \sum_{j=1}^{J} h_{L,i} m_j^{(j)} + \sum_{j=1}^{J} \gamma_{L,i} m_j^{(j)}$$

3. A computer-readable medium for recording a program designed to cause a computer, at an entity end, to generate a common key used in encryption processing from plaintext to ciphertext and in decryption processing from ciphertext to plaintext in a cryptographic communications system, wherein said program comprises:

first program code means for causing said computer to select components corresponding to divided specifying information for another entity to be communicated with from a secret key peculiar to said entity produced according to formulas below for each divided specifying information resulting from division of specifying information for said entity into a plurality of blocks; and second program code means for causing said computer to generate said common key according to formulas below using said selected components, wherein $\vec{s}_{R,i}{}^{(j)} \equiv \alpha_i(\vec{h}_{R,i}{}^{(j)} + \vec{\gamma}_{R,i}{}^{(j)})(\text{mod } \lambda(N))$ $\vec{s}_{L,i}{}^{(j)} \equiv \beta_i(\vec{h}_{L,i}{}^{(j)} + \vec{\gamma}_{L,i}{}^{(j)})(\text{mod } \lambda(N))$ Secret keys $g^{a_i^p b_i^q c_i^r}$ numbering $(T+1)(T+2)/2$ where $p+q+r=T$, $a_i$, $b_i$, and $c_i$ satisfy following relationships $a_i \cdot \alpha_i \equiv 1(\text{mod } \lambda(N))$ $b_i \cdot \beta_i \equiv 1(\text{mod } \lambda(N))$ $\sum_{j=1}^{J} \gamma_i^{(j)} + c_i = \lambda(N)$ where vector $S_{R,i}{}^{(j)}$ and vector $S_{L,i}{}^{(j)}$ are two types of secret key corresponding to j'th divided specifying information for entity i (j=2, 3, ..., J);

vector $h_{R,i}{}^{(j)}$, vector $h_{L,i}{}^{(j)}$ are key division vector of entity i, vector $h_{R,i}{}^{(j)}$+vector $h_{L,i}{}^{(j)}$=vector $h_i{}^{(j)}$;

vector $h_i{}^{(j)}$ is a vector obtained by extracting one row from a matrix $H^{(j)}$ corresponding to j'th divided specifying information for entity i;

$H^{(j)}$ is a symmetrical $2^{Mj} \times 2^{Mj}$ matrix formed of random numbers;

$M_j$ is size of j'th divided specifying information for entity i;

J is number of block divisions in specifying information for entity i;

$\alpha_i$, $\beta_i$ are personal secret random numbers for entity i where gcd ($\alpha_i$, $\lambda(N)$)=1, gcd ($\beta_i$, $\lambda(N)$)=1, and $\lambda(\cdot)$ is Carmichael function;

N is an integer;

$\gamma i^{(j)}$, $c_i$ are personal secret random numbers for entity i where $\gamma i^{(1)} + \gamma i^{(2)} + \ldots + \gamma i^{(J)} + c_i = \lambda(N)$ vector $\gamma_{R,i}{}^{(j)}$, vector $\gamma_{L,i}{}^{(j)}$ are random number division vectors of entity i, vector $\gamma_{R,im}{}^{(j)}$+vector $\gamma_{L,im}{}^{(j)}$=$\gamma_i{}^{(j)}$ vector 1 for entity m (where vector 1=(1, 1, ..., 1);

g is an integer mutually prime with N; and

T is degree of exponent portion, and wherein, $K_{im} \equiv \prod_{p+q+r=T} (g a_i^p b_i^q c_i^r)^{S_{R,im}^p S_{L,im}^q \frac{T!}{p!q!r!}}$ $\equiv \prod_{p+q+r=T} g^{\frac{T!}{p!q!r!} X_{R,im}^p X_{L,im}^q c_i^r}$ $\equiv g^{\sum_{p+q+r=T} \frac{T!}{p!q!r!} X_{R,im}^p X_{L,im}^q c_i^r}$ $\equiv g^{(X_{R,im} + X_{L,im} + c_i)^T}$ $\equiv g^{\left\{\sum_{j=1}^{J}\left(h_{R,im_j}^{(j)} + \gamma_{R,im_j}^{(j)} + h_{L,im_j}^{(j)} + \gamma_{L,im_j}^{(j)}\right) + c_i\right\}^T}$ -continued $\equiv g^{\left(\sum_{j=1}^{J} h_{i,jm_j}^{(j)} + \lambda(N)\right)^T}$ $\equiv g^{\left(\sum_{j=1}^{J} h_{i,jm_j}^{(j)}\right)^T}$ $\equiv K_{mi}(\text{mod } N)$ where $S_{R,im}$ is a sum on the integer ring of components $S_{R,im_j}{}^{(j)}$ corresponding to the divided specifying information for entity m, extracted from the secret key vector $S_{R,i}{}^{(j)}$ for entity i, expressed as given below;

$S_{L,im}$ is a sum on the integer ring of components $S_{L,im_j}{}^{(j)}$ corresponding to the divided specifying information for entity m, extracted from the secret key vector $S_{L,i}{}^{(j)}$ for entity i, expressed as given below; and $K_{im}$ is a common key generated by one entity i for another entity m, and wherein $S_{R,im} = \sum_{j=1}^{J} s_{R,im_j}^{(j)}$ $= \alpha_i X_{R,im}$ where . . .

$X_{R,i}m = \sum_{j=1}^{J} h_{R,i}m_j^{(j)} + \sum_{j=1}^{J} \gamma_{R,i}m_j^{(j)}$ $S_{L,i}m = \sum_{j=1}^{J} s_{L,i}m_j^{(j)}$ $= \beta_i X_{L,i}m$ where . . .

$X_{L,i}m = \sum_{j=1}^{J} h_{L,i}m_j^{(j)} + \sum_{j=1}^{J} \gamma_{L,i}m_j^{(j)}$ 4. A computer data signal embodied in a carrier wave for transmitting a program comprising:

first program code means for causing said computer to select components corresponding to divided specifying information for another entity to be communicated with from secret keys peculiar to said entity produced according to formulas below for each divided specifying information of said entity resulting from division of specifying information for said entity into a plurality of blocks; and second program code means for causing said computer to generate a common key according to formulas below using said selected components, wherein $\vec{s}_{R,i}{}^{(j)} \equiv \alpha_i(\vec{h}_{R,i}{}^{(j)} + \vec{\gamma}_{R,i}{}^{(j)})(\text{mod } \lambda(N))$ $\vec{s}_{L,i}{}^{(j)} \equiv \beta_i(\vec{h}_{L,i}{}^{(j)} + \vec{\gamma}_{L,i}{}^{(j)})(\text{mod } \lambda(N))$ Secret keys $g^{a_i^p b_i^q c_i^r}$ numbering $(T+1)(T+2)/2$ where $p+q+r=T$ $a_i$, $b_i$, and $c_i$ satisfy following relationships $a_i \cdot \alpha_i \equiv 1 \pmod{\lambda(N)}$ $b_i \cdot \beta_i \equiv 1 \pmod{\lambda(N)}$ $$\sum_{j=1}^{J} \gamma_i^{(j)} + c_i = \lambda(N)$$

where vector $S_{R,i}^{(j)}$ and vector $S_{L,i}^{(j)}$ are two types of secret key corresponding to j'th divided specifying information for entity i (j=2, 3, . . . , J);

vector $h_{R,i}^{(j)}$, vector $h_{L,i}^{(j)}$ are key division vector of entity i, vector $h_{R,i}^{(j)}$+vector $h_{L,i}^{(j)}$=vector $h_i^{(j)}$;

vector $h_i^{(j)}$ is a vector obtained by extracting one row from a matrix $H^{(j)}$ corresponding to j'th divided specifying information for entity i;

$H^{(j)}$ is a symmetrical $2^{Mj} \times 2^{Mj}$ matrix formed of random numbers;

$M_j$ is size of j'th divided specifying information for entity i;

J is number of block divisions in specifying information for entity i;

$\alpha_i$, $\beta_i$ are personal secret random numbers for entity i where gcd ($\alpha_i$, $\lambda(N)$)=1, gcd ($\beta_i$, $\lambda(N)$)=1, and $\lambda(\cdot)$ is Carmichael function;

N is an integer;

$\gamma i^{(j)}$, $c_i$ are personal secret random numbers for entity i where $\gamma i^{(1)} + \gamma i^{(2)} + \ldots \alpha \gamma i^{(J)} + c_i = \lambda(N)$ vector $\gamma_{R,i}^{(j)}$, vector $\gamma_{L,i}^{(j)}$ are random number division vectors of entity i, vector $\gamma_{R,im}^{(j)}$+vector $\gamma_{L,im}^{(j)}$=$\gamma_i^{(j)}$ vector 1 for entity m (where vector 1=(1, 1, . . . , 1);

g is an integer mutually prime with N; and

T is degree of exponent portion, and wherein $$K_{im} \equiv \prod_{p+q+r=T} \left(g^{a_i^p b_i^q c_i^r}\right)^{S_{R,im}^p S_{L,im}^q \frac{T!}{p!q!r!}}$$

$$\equiv \prod_{p+q+r=T} g^{\frac{T!}{p!q!r!} X_{R,im}^p X_{L,im}^q c_i^r}$$

$$\equiv g^{\sum_{p+q+r=T} \frac{T!}{p!q!r!} X_{R,im}^p X_{L,im}^q c_i^r}$$

$$\equiv g^{(X_{R,im} + X_{L,im} + c_i)^T}$$

$$\equiv g^{\left\{\sum_{j=1}^{J} \left(h_{R,im_j}^{(j)} + \gamma_{R,im_j}^{(j)} + h_{L,im_j}^{(j)} + \gamma_{L,im_j}^{(j)}\right) + c_i\right\}^T}$$

$$\equiv g^{\left(\sum_{j=1}^{J} h_{i,jm_j}^{(j)} + \lambda(N)\right)^T}$$

$$\equiv g^{\left(\sum_{j=1}^{J} h_{i,jm_j}^{(j)}\right)^T}$$

$$\equiv K_{mi} \pmod{N}$$

where $S_{R,im}$ is a sum on the integer ring of components $S_{R,im_j}^{(j)}$ corresponding to the divided specifying information for entity m, extracted from the secret key vector $S_{R,i}^{(j)}$ for entity i, expressed as given below;

$S_{L,im}$ is a sum on the integer ring of components $S_{L,im_j}^{(j)}$ corresponding to the divided specifying information for entity m, extracted from the secret key vector $S_{L,i}^{(j)}$ for entity i, expressed as given below; and $K_{im}$ is a common key generated by one entity i for another entity m, and wherein, $$S_{R,im} = \sum_{j=1}^{J} s_{R,im_j}^{(j)}$$

$$= \alpha_i X_{R,im}$$

where . . .

$$X_{R,i}m = \sum_{j=1}^{J} h_{R,i}m_j^{(j)} + \sum_{j=1}^{J} \gamma_{R,i}m_j^{(j)}$$

$$S_{L,i}m = \sum_{j=1}^{J} s_{L,i}m_j^{(j)}$$

$$= \beta_i X_{L,i}m$$

where . . .

$$X_{L,i}m = \sum_{j=1}^{J} h_{L,i}m_j^{(j)} + \sum_{j=1}^{J} \gamma_{L,i}m_j^{(j)}$$

5. An encryption method wherein:

specifying information of an entity is divided into a plurality of blocks of divided specifying information, a plurality of row vectors corresponding to said plurality of blocks of divided specifying information are prepared, with each of said row vectors being selected from a symmetrical matrix peculiar to each block;

secret keys peculiar to said entity are generated using said plurality of row vectors;

plaintext is encrypted to ciphertext using a common key generated using components contained in said secret keys, said components corresponding to said plurality of blocks of divided specifying information of another entity that is destination of said ciphertext; and computation formulas for generating said secret keys are as follows, $\vec{s_{R,i}}^{(j)} \equiv \alpha_i (\vec{h_{R,i}}^{(j)} + \vec{\gamma_{R,i}}^{(j)}) \pmod{\lambda(N)}$ $\vec{s_{L,i}}^{(j)} \equiv \beta_i (\vec{h_{L,i}}^{(j)} + \vec{\gamma_{L,i}}^{(j)}) \pmod{\lambda(N)}$ Secret keys $g^{a_i^p b_i^q c_i^r}$ numbering (T+1)(T+2)/2
where p+q+r=T, $a_i$, $b_i$, and $c_i$ satisfy following relationships $a_i \cdot \alpha_i \equiv 1 \pmod{\lambda(N)}$ $b_i \cdot \beta_i \equiv 1 \pmod{\lambda(N)}$ $$\sum_{j=1}^{J} \gamma_i^{(j)} + c_i = \lambda(N)$$

where vector $S_{R,i}^{(j)}$ and vector $S_{L,i}^{(j)}$ are two types of secret key corresponding to j'th divided specifying information for entity i (j=1, 2, . . . , J);

vector $h_{R,i}^{(j)}$, vector $h_{L,i}^{(j)}$ are key division vector of entity i, vector $h_{R,i}^{(j)}$+vector $h_{L,i}^{(j)}$=vector $h_i^{(j)}$;

vector $h_i^{(j)}$ is a vector obtained by extracting one row from a matrix $H^{(j)}$, corresponding to j'th divided specifying information for entity i;

$H^{(j)}$ is a symmetrical $2^{Mj} \times 2^{Mj}$ matrix formed of random numbers;

$M_j$ is size of j'th divided specifying information for entity i;

J is number of block divisions in specifying information for entity i;

$\alpha_i$, $\beta_i$ are personal secret random numbers for entity i where gcd ($\alpha_i$, $\lambda(N)$)=1, gcd ($\beta_i$, $\lambda(N)$)=1, and $\lambda(\cdot)$ is Carmichael function;

N is an integer;

$\gamma i^{(j)}$, $c_i$ are personal secret random numbers for entity i where $\gamma i^{(1)} + \gamma i^{(2)} + \ldots + \gamma i^{(J)} + c_i = \lambda(N)$ vector $\gamma_{R,i}^{(j)}$, vector $\gamma_{L,i}^{(j)}$ are random number division vectors of entity i, vector $\gamma_{R,im}^{(j)}$+vector $\gamma_{L,im}^{(j)} = \gamma_i^{(j)}$ vector 1 for entity m (where vector 1=(1, 1, . . . , 1));

g is an integer mutually prime with N;

T is degree of exponent portion; and wherein computation formulas for generating said secret keys are as follows:

$$K_{im} \equiv \prod_{p+q+r=T} \left(g^{a_i^p b_i^q c_i^r}\right)^{s_{R,im}^p s_{L,im}^q \frac{T!}{p!q!r!}}$$

$$\equiv \prod_{p+q+r=T} g^{\frac{T!}{p!q!r!} X_{R,im}^p X_{L,im}^q c_i^r}$$

$$\equiv g^{\sum_{p+q+r=T} \frac{T!}{p!q!r!} X_{R,im}^p X_{L,im}^q c_i^r}$$

$$\equiv g^{(X_{R,im} + X_{L,im} + c_i)^T}$$

$$\equiv g^{\left\{\sum_{j=1}^{J}\left(h_{R,im_j}^{(j)} + \gamma_{R,im_j}^{(j)} + h_{L,im_j}^{(j)} + \gamma_{L,im_j}^{(j)}\right) + c_i\right\}^T}$$

$$\equiv g^{\left(\sum_{j=1}^{J} h_{i,jm_j}^{(j)} + \lambda(N)\right)^T}$$

$$\equiv g^{\left(\sum_{j=1}^{J} h_{i,jm_j}^{(j)}\right)^T}$$

$$\equiv K_{mi} (\text{mod } N)$$

where $S_{R,im}$ is a sum on the integer ring of components $S_{R,imj}^{(j)}$ corresponding to the divided specifying information for entity m, extracted from the secret key vector $S_{R,i}^{(j)}$ for entity i; this sum is expressed as given below;

$S_{L,im}$ is a sum on the integer ling of components $S_{L,imj}^{(j)}$ corresponding to the divided specifying information for entity m, extracted from the secret key vector $S_{L,i}^{(j)}$ for entity I;

this sum is expressed as given below; and $K_{im}$ is a common key generated by one entity i for another entity m, and wherein, $$S_{R,im} = \sum_{j=1}^{J} s_{R,im_j}^{(j)}$$
$$= \alpha_i X_{R,im}$$

where . . .

$$X_{R,i}m = \sum_{j=1}^{J} h_{R,i}m_j^{(j)} + \sum_{j=1}^{J} \gamma_{R,i}m_j^{(j)}$$

$$S_{L,i}m = \sum_{j=1}^{J} s_{L,i}m_j^{(j)}$$
$$= \beta_i X_{L,i}m$$

where . . .

$$X_{L,i}m = \sum_{j=1}^{J} h_{L,i}m_j^{(j)} + \sum_{j=1}^{J} \gamma_{L,i}m_j^{(j)}$$

6. An encryption method wherein:

specifying information of an entity is divided into a plurality of blocks of divided specifying information, a plurality of row vectors corresponding to said plurality of blocks of divided specifying information are prepared, with each of said row vectors being selected from a symmetrical matrix peculiar to each block;

secret keys peculiar to said entity are generated using said plurality of row vectors;

plaintext is encrypted to ciphertext using a common key generated using components contained in said secret keys, said components corresponding to said plurality of blocks of divided specifying information of another entity that is destination of said ciphertext; and computation formulas for generating said secret keys are as follows, $\vec{s}_{R,i}^{(j)} = \alpha_i(\vec{h}_{R,i}^{(j)} + \vec{\gamma}_{R,i}^{(j)}) (\text{mod } \lambda(N))$ $\vec{s}_{L,i}^{(j)} = \beta_i(\vec{h}_{L,i}^{(j)} + \vec{\gamma}_{L,i}^{(j)}) (\text{mod } \lambda(N))$ Secret keys $g^{a_i^p b_i^q c_i^r}$ numbering (T+1)(T+2)/2 where p+q+r=T $a_i$, $b_i$, and $c_i$ satisfy following relationships $a_i \cdot \alpha_i \equiv 1 (\text{mod } \lambda(N))$ $b_i \cdot \beta_i \equiv 1 (\text{mod } \lambda(N))$ $$\sum_{j=1}^{J} \gamma_i^{(j)} + c_i = \lambda(N)$$

where vector $S_{R,i}^{(j)}$ and vector $S_{L,i}^{(j)}$ are two types of secret key corresponding to j'th divided specifying information for entity i (j=1, 2, . . . , J);

vector $h_{R,i}^{(j)}$, vector $h_{L,i}^{(j)}$ are key division vector of entity i, vector $h_{R,i}^{(j)}$+vector $h_{L,i}^{(j)}$=vector $h_i^{(j)}$;

vector $h_i^{(j)}$ is a vector obtained by extracting one row from a matrix $H^{(j)}$, corresponding to j'th divided specifying information for entity i;

$H^{(j)}$ is a symmetrical $2^{Mj} \times 2^{Mj}$ matrix formed of random numbers;

$M_j$ is size of j'th divided specifying information for entity i;

J is number of block divisions in specifying information for entity i;

$\alpha_i$, $\beta_i$ are personal secret random numbers for entity i where $\gcd(\alpha_i, \lambda(N))=1$, $\gcd(\beta_i, \lambda(N))=1$, and $\lambda(\cdot)$ is Carmichael function;

N is an integer;

$\gamma i^{(j)}$, $c_i$ are personal secret random numbers for entity i where $\gamma i^{(1)} + \gamma i^{(2)} + \ldots + \gamma i^{(J)} + c_i = \lambda(N)$ vector $\gamma_{R,i}^{(j)}$, vector $\gamma_{L,i}^{(j)}$ are random number division vectors of entity i, vector $\gamma_{R,im}^{(j)}$+vector $\gamma_{L,im}^{(j)} = \gamma_i^{(j)}$ vector 1 for entity m (where vector $1=(1, 1, \ldots, 1)$);

g is an integer mutually prime with N;

T is degree of exponent portion;

wherein either said N is such that N=PQ (where P and Q are prime), or said N is prime, and said g is a maximum generating element having modulo N; and wherein computation formulas for generating said secret keys are as follows:

$$K_{im} \equiv \prod_{p+q+r=T} \left(g^{a_i^p b_i^q c_i^r}\right)^{S_{R,im}^p S_{L,im}^q \frac{T!}{p!q!r!}}$$

$$\equiv \prod_{p+q+r=T} g^{\frac{T!}{p!q!r!} X_{R,im}^p X_{L,im}^q c_i^r}$$

$$\equiv g^{\sum_{p+q+r=T} \frac{T!}{p!q!r!} X_{R,im}^p X_{L,im}^q c_i^r}$$

$$\equiv g^{(X_{R,im} + X_{L,im} + c_i)^T}$$

$$\equiv g^{\left\{\sum_{j=1}^{J}\left(h_{R,im_j^{(j)}} + \gamma_{R,im_j^{(j)}} + h_{L,im_j^{(j)}} + \gamma_{L,im_j^{(j)}}\right) + c_i\right\}^T}$$

$$\equiv g^{\left(\sum_{j=1}^{J} h_{i,j} m_j^{(j)} + \lambda(N)\right)^T}$$

$$\equiv g^{\left(\sum_{j=1}^{J} h_{i,j} m_j^{(j)}\right)^T}$$

$$\equiv K_{mi} (\text{mod } N)$$

where $S_{R,im}$ is a sum on the integer ring of components $S^{R,im(j)}$ corresponding to the divided specifying information for entity m, extracted from the secret key vector $S_{R,i}^{(j)}$ for entity i, expressed as given below;

$S_{L,im}$ is a sum on the integer ring of components $S_{L,imj}^{(j)}$ corresponding to the divided specifying information for entity m, extracted from the secret key vector $S_{L,i}^{(j)}$ for entity i, expressed as given below; and $K_{im}$ is a common key generated by one entity i for another entity m, and wherein $$S_{R,im} = \sum_{j=1}^{J} s_{R,im_j^{(j)}}$$

$$= \alpha_i X_{R,im}$$

where . . .

$$X_{R,i}m = \sum_{j=1}^{J} h_{R,i} m_j^{(j)} + \sum_{j=1}^{J} \gamma_{R,i} m_j^{(j)}$$

$$S_{L,i}m = \sum_{j=1}^{J} s_{L,i} m_j^{(j)}$$

$$= \beta_i X_{L,i}m$$

where . . .

$$X_{L,i}m = \sum_{j=1}^{J} h_{L,i} m_j^{(j)} + \sum_{j=1}^{J} \gamma_{L,i} m_j^{(j)}$$

7. A cryptographic communications method wherein:

specifying information of one entity is divided into a first plurality of blocks of divided specifying information, a first plurality of row vectors are provided for the first plurality of blocks of divided specifying information respectively, each of said row vectors being selected from a symmetrical matrix peculiar to each block;

specifying information of another entity is divided into a second plurality of blocks of divided specifying information, a second plurality of row vectors are provided for the second plurality of blocks of divided specifying information respectively, each of said row vectors being selected from a symmetrical matrix peculiar to each block;

a plurality of centers are deployed such that said plurality of centers generate first secret keys for said first plurality of row vectors respectively using said first plurality of row vectors, the first secret keys being peculiar to said one entity, and send the first secret keys to said one entity, and generate second secret keys for said second plurality of row vectors respectively using said second plurality of row vectors, the second secret keys being peculiar to said another entity, and send the second secret keys to said another entity;

said one entity encrypts plaintext to ciphertext using a first common key divided from the first secret keys, said first common key being generated using components contained in the first secret keys, said components corresponding to said second plurality of blocks of divided specifying information, and sends the ciphertext to said another entity;

said another entity decrypts said ciphertext so sent using a second common key identical to said first common key, said second common key being derived from the second secret keys, said second common key being generated using components contained in said second secret keys, said components corresponding to said first plurality of divided specifying information of said one entity; and computation formulas for generating said first and second secret keys are as follows:

$$\vec{s}_{R,i}^{(j)} \equiv \alpha_i(\vec{h}_{R,i}^{(j)} + \vec{\gamma}_{R,i}^{(j)})(\text{mod } \lambda(N))$$

$$\vec{s}_{L,i}^{(j)} \equiv \beta_i(\vec{h}_{L,i}^{(j)} + \vec{\gamma}_{L,i}^{(j)})(\text{mod } \lambda(N))$$

Secret keys $g^{a_i^p b_i^q c_i^r}$ numbering $(T+1)(T+2)/2$ where $p+q+r=T$, $a_i$, $b_i$, and $c_i$ satisfy following relationships $a_i \cdot \alpha_i \equiv 1 \pmod{\lambda(N)}$ $b_i \cdot \beta_i \equiv 1 \pmod{\lambda(N)}$ $$\sum_{j=1}^{J} \gamma_i^{(j)} + c_i = \lambda(N)$$

where vector $S_{R,i}^{(j)}$ and vector $S_{L,i}^{(j)}$ are two types of secret key corresponding to j'th divided specifying information for entity i G=2, 3, . . . , J);

vector $h_{R,i}^{(j)}$, vector $h_{L,i}^{(j)}$ are key division vector of entity i, vector $h_{R,i}^{(j)}$+vector $h_{L,i}^{(j)}$=vector $h_i^{(j)}$;

vector $h_i^{(j)}$ is a vector obtained by extracting one row from a matrix $H^{(j)}$ corresponding to j'th divided specifying information for entity i;

$H^{(j)}$ is a symmetrical $2^{Mj} \times 2^{Mj}$ matrix formed of random numbers;

$M_j$ is size of j'th divided specifying information for entity i;

J is number of block divisions in specifying information for entity i;

$\alpha_i$, $\beta_i$ are personal secret random numbers for entity i where gcd ($\alpha_i$, $\lambda(N)$)=1, gcd ($\beta_i$, $\lambda(N)$)=1, and $\lambda(\cdot)$ is Carmichael function;

N is an integer;

$\gamma i^{(j)}$, $c_i$ are personal secret random numbers for entity i where $\gamma i^{(1)} + \gamma i^{(2)} + \ldots + \gamma i^{(J)} + c_i = \lambda(N)$ vector $\gamma_{R,i}^{(j)}$, vector $\gamma_{L,i}^{(j)}$ are random number division vectors of entity i, vector $\gamma_{R,im}^{(j)}$+vector $\gamma_{L,im}^{(j)} = \gamma_i^{(j)}$ vector 1 for entity m (where vector 1=(1, 1, . . . , 1);

g is an integer mutually prime with N;

T is degree of exponent portion; and wherein computation formulas for generating said secret keys peculiar to entities are as follows:

$$K_{im} \equiv \prod_{p+q+r=T} \left( g^{a_i^p b_i^q c_i^r} \right)^{S_{R,im}^p S_{L,im}^q \frac{T!}{p!q!r!}}$$

$$\equiv \prod_{p+q+r=T} g^{\frac{T!}{p!q!r!} X_{R,im}^p X_{L,im}^q c_i^r}$$

$$\equiv g^{\sum_{p+q+r=T} \frac{T!}{p!q!r!} X_{R,im}^p X_{L,im}^q c_i^r}$$

$$\equiv g^{(X_{R,im} + X_{L,im} + c_i)^T}$$

$$\equiv g^{\left\{ \sum_{j=1}^{J} \left( h_{R,im_j}^{(j)} + \gamma_{R,im_j}^{(j)} + h_{L,im_j}^{(j)} + \gamma_{L,im_j}^{(j)} \right) + c_i \right\}^T}$$

$$\equiv g^{\left( \sum_{j=1}^{J} h_{i,jm_j}^{(j)} + \lambda(N) \right)^T}$$

$$\equiv g^{\left( \sum_{j=1}^{J} h_{i,jm_j}^{(j)} \right)^T}$$

$$\equiv K_{mi} \pmod{N}$$

where $S_{R,im}$ is a sum on the integer ring of components $S_{R,im_j}^{(j)}$ corresponding to the divided specifying information for entity m, extracted from the secret key vector $S_{R,i}^{(j)}$ for entity i, expressed as given below;

$S_{L,im}$ is a sum on the integer ring of components $S_{L,im_j}^{(j)}$ corresponding to the divided specifying information for entity m, extracted from the secret key vector $S_{L,i}^{(j)}$ for entity i, expressed as given below; and $K_{im}$ is a common key generated by one entity i for another entity m, and wherein $$S_{R,im} = \sum_{j=1}^{J} s_{R,im_j}^{(j)}$$

$$= \alpha_i X_{R,im}$$

where . . .

$$X_{R,i}m = \sum_{j=1}^{J} h_{R,im_j}^{(j)} + \sum_{j=1}^{J} \gamma_{R,im_j}^{(j)}$$

$$S_{L,i}m = \sum_{j=1}^{J} s_{L,i}m_j^{(j)}$$

$$= \beta_i X_{L,i}m$$

where . . .

$$X_{L,i}m = \sum_{j=1}^{J} h_{L,i}m_j^{(j)} + \sum_{j=1}^{J} \gamma_{L,i}m_j^{(j)}$$

8. A cryptographic communications method wherein:

specifying information of one entity is divided into a first plurality of blocks of divided specifying information, a first plurality of row vectors are provided for the first plurality of blocks of divided specifying information respectively, each of said row vectors being selected from a symmetrical matrix peculiar to each block;

specifying information of another entity is divided into a second plurality of blocks of divided specifying information, a second plurality of row vectors are provided for the second plurality of blocks of divided specifying information respectively, each of said row vectors being selected from a symmetrical matrix peculiar to each block;

a plurality of centers are deployed such that said plurality of centers generate first secret keys for said first plurality of row vectors respectively using said first plurality of row vectors, the first secret keys being peculiar to said one entity, and send the first secret keys to said one entity, and generate second secret keys for said second plurality of row vectors respectively using said second plurality of row vectors, the second secret keys being peculiar to said another entity, and send the second secret keys to said another entity;

said one entity encrypts plaintext to ciphertext using a first common key divided from the first secret keys, said first common key being generated using components contained in the first secret keys, said components corresponding to said second plurality of blocks of divided specifying information, and sends the ciphertext to said another entity;

said another entity decrypts said ciphertext so sent using a second common key identical to said first common key, said second common key being derived from the second secret keys, said second common key being generated using components contained in said second secret keys, said components corresponding to said first plurality of divided specifying information of said one entity; and computation formulas for generating said first and second secret keys are as follows:

$$\vec{s}_{R,i}^{(j)} = \alpha_i(\vec{h}_{R,i}^{(j)} + \vec{\gamma}_{R,i}^{(j)}) \pmod{\lambda(N)}$$

$$\vec{s}_{L,i}^{(j)} = \beta_i(\vec{h}_{L,i}^{(j)} + \vec{\gamma}_{L,i}^{(j)}) \pmod{\lambda(N)}$$

Secret keys $g^{a_i^p b_i^q c_i^r}$ numbering $(T+1)(T+2)/2$
where $p+q+r=T$,
$a_i$, $b_i$, and $c_i$ satisfy following relationships $a_i \cdot \alpha_i \equiv 1 \pmod{\lambda(N)}$ $b_i \cdot \alpha_i \equiv 1 \pmod{\lambda(N)}$ $$\sum_{j=1}^{J} \gamma_i^{(j)} + c_i = \lambda(N)$$

where vector $S_{R,i}^{(j)}$ and vector $S_{L,i}^{(j)}$ are two types of secret key corresponding to j'th divided specifying information for entity i G=2, 3, . . . , J);

vector $h_{R,i}^{(j)}$, vector $h_{L,i}^{(j)}$ are key division vector of entity i, vector $h_{R,i}^{(j)}$+vector $h_{L,i}^{(j)}$=vector $h_i^{(j)}$;

vector $h_i^{(j)}$ is a vector obtained by extracting one row from a matrix $H^{(j)}$ corresponding to j'th divided specifying information for entity i;

$H^{(j)}$ is a symmetrical $2^{M_j} \times 2^{M_j}$ matrix formed of random numbers;

$M_j$ is size of j'th divided specifying information for entity i;

J is number of block divisions in specifying information for entity i;

$\alpha_i$, $\beta_i$ are personal secret random numbers for entity i where gcd $(\alpha_i, \lambda(N))=1$, gcd $(\beta_i, \lambda(N))=1$, and $\lambda(\cdot)$ is Carmichael function;

N is an integer;

$\gamma_i^{(j)}$, $c_i$ are personal secret random numbers for entity i where $\gamma_i^{(1)}+\gamma_i^{(2)}+ \ldots +\gamma_i^{(J)}+c_i=\lambda(N)$ vector $\gamma_{R,i}^{(j)}$, vector $\gamma_{L,i}^{(j)}$ are random number division vectors of entity i, vector $\gamma_{R,im}^{(j)}$+vector $\gamma_{L,im}^{(j)}=\gamma_i^{(j)}$ vector 1 for entity m (where vector 1=(1, 1, . . . , 1);

g is an integer mutually prime with N;

T is degree of exponent portion;

wherein either said N is such that N=PQ (where P and Q are prime), or said N is prime, and said g is a maximum generating element having modulo N; and wherein computation formulas for generating said secret keys peculiar to entities are as follows:

$$K_{im} \equiv \prod_{p+q+r=T} \left(g^{a_i^p b_i^q c_i^r}\right)^{S_{R,im}^p S_{L,im}^q \frac{T!}{p!q!r!}}$$

-continued $$\equiv \prod_{p+q+r=T} g^{\frac{T!}{p!q!r!} X_{R,im}^p X_{L,im}^q c_i^r}$$

$$\equiv g^{\sum_{p+q+r=T} \frac{T!}{p!q!r!} X_{R,im}^p X_{L,im}^q c_i^r}$$

$$\equiv g^{(X_{R,im} + X_{L,im} + c_i)^T}$$

$$\equiv g^{\left\{\sum_{j=1}^{J}\left(h_{R,im_j}^{(j)} + \gamma_{R,im_j}^{(j)} + h_{L,im_j}^{(j)} + \gamma_{L,im_j}^{(j)}\right) + c_i\right\}^T}$$

$$\equiv g^{\left(\sum_{j=1}^{J} h_{i_j m_j}^{(j)} + \lambda(N)\right)^T}$$

$$\equiv g^{\left(\sum_{j=1}^{J} h_{i_j m_j}^{(j)}\right)^T}$$

$$\equiv K_{mi} \pmod{N}$$

where $S_{R,im}$ is a sum on the integer ring of components $S_{R,imj}^{(j)}$ corresponding to the divided specifying information for entity m, extracted from the secret key vector $S_{R,i}^{(j)}$ for entity i, expressed as given below;

$S_{L,im}$ is a sum on the integer ring of components $S_{L,imj}^{(j)}$ corresponding to the divided specifying information for entity m, extracted from the secret key vector $S_{L,i}^{(j)}$ for entity i, expressed as given below; and $K_{im}$ is a common key generated by one entity i for another entity m, where $$S_{R,i}m = \sum_{j=1}^{J} s_{R,i} m_j^{(j)}$$

$$= \alpha_i X_{R,i}m$$

where . . .

$$X_{R,i}m = \sum_{j=1}^{J} h_{R,i} m_j^{(j)} + \sum_{j=1}^{J} \gamma_{R,i} m_j^{(j)}$$

$$S_{L,i}m = \sum_{j=1}^{J} s_{L,i} m_j^j$$

$$= \beta_i X_{L,i}m$$

where . . .

$$X_{L,i}m = \sum_{j=1}^{J} h_{L,i} m_j^{(j)} + \sum_{j=1}^{J} \gamma_{L,i} m_j^{(j)}$$

* * * * *

UNITED STATES PATENT AND TRADEMARK OFFICE
CERTIFICATE OF CORRECTION

| | |
|---|---|
| PATENT NO. | : 7,080,255 B1 |
| APPLICATION NO. | : 09/573915 |
| DATED | : July 18, 2006 |
| INVENTOR(S) | : Kasahara et al. |

Page 1 of 1

It is certified that error appears in the above-identified patent and that said Letters Patent is hereby corrected as shown below:

On the Title Page, Col. 1, Item [73] (Assignee Section), after "Murata Kikai Kabushiki Kaisha" change "Osaka (JP)" to --KYOTO (JP)--.

Signed and Sealed this

Fourth Day of December, 2007

JON W. DUDAS
*Director of the United States Patent and Trademark Office*